US006609215B1

(12) United States Patent
Hamilton, II et al.

(10) Patent No.: US 6,609,215 B1
(45) Date of Patent: Aug. 19, 2003

(54) METHOD AND SYSTEM FOR IMPLEMENTING NETWORK FILESYSTEM-BASED CUSTOMIZED COMPUTER SYSTEM AUTOMATED REBUILD TOOL

(75) Inventors: Rick A. Hamilton, II, Austin, TX (US); Steven Jay Lipton, Flower Mound, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/422,361

(22) Filed: Oct. 21, 1999

(51) Int. Cl.⁷ .................................................. G06F 11/00
(52) U.S. Cl. ........................................................ 714/15
(58) Field of Search ............................... 714/15, 20, 13

(56) References Cited

U.S. PATENT DOCUMENTS

| | | | | |
|---|---|---|---|---|
| 5,673,382 A | * | 9/1997 | Cannon et al. ............. | 707/202 |
| 5,790,773 A | | 8/1998 | DeKoning et al. ..... | 395/182.04 |
| 5,799,147 A | * | 8/1998 | Shannon ...................... | 714/15 |
| 5,819,020 A | * | 10/1998 | Beeler, Jr. ................... | 707/204 |
| 5,838,660 A | | 11/1998 | Croslin ........................ | 370/216 |
| 5,909,540 A | | 6/1999 | Carter et al. ........... | 395/182.02 |
| 5,958,062 A | * | 9/1999 | Komasaka et al. ............ | 714/1 |
| 5,974,563 A | * | 10/1999 | Beeler, Jr. ................... | 707/204 |
| 6,219,719 B1 | * | 4/2001 | Graf ............................ | 700/291 |
| 6,249,879 B1 | * | 6/2001 | Walker et al. ................ | 714/11 |
| 6,332,200 B1 | * | 12/2001 | Meth et al. .................. | 707/203 |
| 6,363,498 B1 | * | 3/2002 | Howell ........................ | 379/268 |
| 6,363,499 B1 | * | 3/2002 | Delo et al. ................... | 714/156 |
| 6,385,707 B1 | * | 5/2002 | Maffezzoni ................. | 211/111 |
| 6,405,325 B1 | * | 6/2002 | Lin et al. ..................... | 707/200 |
| 6,438,749 B1 | * | 8/2002 | Chamberlain ................ | 714/15 |

* cited by examiner

Primary Examiner—Robert Beausoliel
Assistant Examiner—Bryce P. Bonzo
(74) Attorney, Agent, or Firm—Duke W. Yee; David A. Mims, Jr.; Lisa L. B. Yociss

(57) ABSTRACT

Initially, an automated data collection script is updated to include the identity and location of files containing personality and license information. A list of workstations to be that are supported in case of failure is then compiled. The workstation list is called by the data collection script when it is executed. The data collection script collects personality and license information from the specified file on the listed workstations. The data collection script then outputs personality and license information to a temporary file at an offboard location. Upon notification of a failure of one of the workstations on the list, a restoration script is executed, which uses the output from the data collection script for restoring personality and license information that may have been lost due to the system failure.

23 Claims, 39 Drawing Sheets

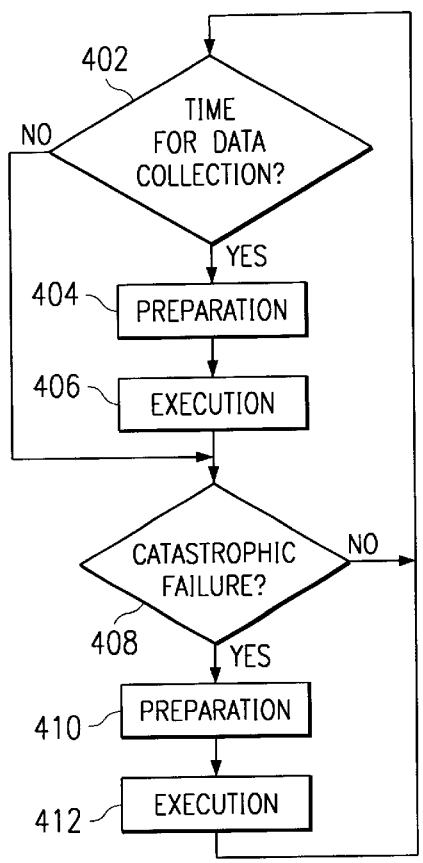
FIG. 4
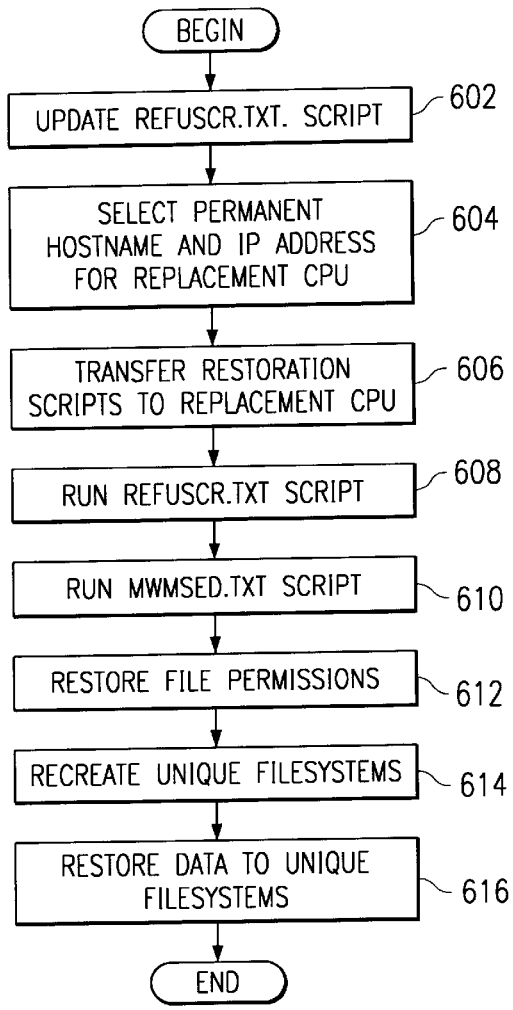
FIG. 6
```
echo "                _____Date           _____Date           _____
Date">>$hdir/$i.checklist.txt
echo " " >>$hdir/$i.checklist.txt
if [[ -a /ibm2/$i/fulltty.data ]] then
cat /ibm2/$i/fulltty.data >>/$hdir/$i.checklist.txt
fi
echo " " >>$hdir/$i.checklist.txt
if [[ -a /ibm2/$i/etc.qconfig ]] then
cat /ibm2/$i/etc.qconfig|grep -v "*" >> $hdir/$i.checklist.txt
fi
#enq $hdir/$i.checklist.txt
done
```
FIG. 7B

```
!/bin/ksh
hdir=/home/slipton/gtetools
rm $hdir/*.checklist.txt
for i in 'cat $hdir/wsname2.list'
do
echo "                   GTE CUSTOMIZATION CHECKLIST">$hdir/$i.checklist.txt
date>>$hdir/$i.checklist.txt
echo $i" " >>$hdir/$i.checklist.txt
echo "en0 and en1 IP address">>$hdir/$i.checklist.txt
cat /ibm2/$i/en0.addr>>$hdir/$i.checklist.txt
cat /ibm2/$i/en1.addr>>$hdir/$i.checklist.txt
cat /ibm2/$i/ether.state >>$hdir/$i.checklist.txt
echo "en0 and en1 netmask">>$hdir/$i.checklist.txt
cat /ibm2/$i/en0.netmask>>$hdir/$i.checklist.txt
cat /ibm2/$i/en1.netmask>>$hdir/$i.checklist.txt
cat /ibm2/$i/fs.softwin.sizes>>$hidr/$i.checklist.txt
echo " " >>$hdir/$i.checklist.txt
echo "____Get client hostname         ____Restore
SoftWindows">>$hdir/$i.checklist.txt
echo " " >>$hdir/$i.checklist.txt
echo "____Connect to NIM Server       ____Restore Wingz & WordPerfect
lic.">>$hdir/$i.checklist.txt
echo " " >>$hdir/$i.checklist.txt
echo "____Restore networking files    ____Restore TONICS">>$hdir/$i.checklist.txt
echo " " >>$hdir/$i.checklist.txt
echo "____Restore crontabs files      ____Restore ethernet IP
address">>$hdir/$i.checklist.txt
echo " " >>$hdir/$i.checklist.txt
echo "____Restore /home/local & /usr/local ____Restore password
information">>$hdir/$i.checklist.txt
echo " " >>$hdir/$i.checklist.txt
echo "____Restore tty's               ____Restore inittab
information">>$hdir/$i.checklist.txt
echo " " >>$hdir/$i.checklist.txt
echo "____Restore remote printers     ____Restore filesystems
information">>$hdir/$i.checklist.txt
echo " " >>$hdir/$i.checklist.txt
echo "____Restore ADSM include/exclude ____Cleanup">>$hdir/$i.checklist.txt
echo " " >>$hdir/$i.checklist.txt
echo "____/tmp cleaned ">>$hdir/$i.checklist.txt
echo " " >>$hdir/$i.checklist.txt
echo " Prepared by _____ S.Lipton _____ D. Cook _____
Other">>$hdir/$i.checklist.txt
echo " ">>$hdir/$i.checklist.txt
```

*FIG. 7A*

```
!/bin/ksh
####################################################################

# NAME: get.client.info.script

# Purpose: This script will retrieve customized directories and files from
#          the node(client) and will store the information on the NIM server,
#          nimsvr, under a unique directory for that node: /ibm/nodename/...
#          Directories will be built on the NIM server (nimsvr) that contain
#          the /home/local directory and other pertinent user files.

# Input file: Input required for this script will be the list of workstations
#          to be updated on a particular day.

# Created by: Steven J. Lipton, IBM Global Services
# Creation date: July, 1997
# Modified by:
# Modification date:
# Input:wsname.list

####################################################################

#--------------------
# Housekeeping
#--------------------

#--------------------
# Test for the installation server name
#--------------------

if [[ $# = 0 ]] then
        svr421=nimsvr
else
        svr421 =$1
fi
#--------------------
# Set environment variables
#--------------------
ibmdir=/ibm2
hdir=/home/slipton/gtetools
logfile=$hdir/logfile.txt
errorfile=$hdir/errorfile.list
wslist=$hdir/wsname.list
wslist2=$hdir/wsname2.list
wslist3=$hdir/wsname3.list if [[ -f $wslist2 ]] then
        rm $wslist2
```

FIG. 8A

```
    fi if [[ -f $wslist3 ]] then
          rm $wslist3
    fi

------------------------------
# Get the correct path for the list of systems to update
#------------------------------

#------------------------------
# Verify the connectivity to the clients and create a
# working list of hostnames.
#------------------------------
for i in 'cat $wslist'
do
            rsh $i /usr/bin/ls /tmp>/dev/null 2>/dev/null
#           ping -c 2 $i>/dev/null
            if [[ $? = 0 ]] then
                  echo $i>>$wslist2
#                 echo $i "available"
echo =========== fi
            if [[ $? != 0 ]] then
#                 echo $i "not available"
#                 echo ===========
#                 echo " "
                  echo =========>>$wslist3
                  echo date >>$wslist3
                  echo "This host not available" $i>>$wslist3
                  echo =========>>$wslist3
            fi
done
#------------------------------
# Start of Main Line Do Loop
------------------------------ for i in 'cat $wslist2'
do
echo 'date'>>$logfile
echo "Capturing custom configuration information for " $i
#------------------------------
# Create directory on Server
#------------------------------
mkdir /ibm2/$i
```

*FIG. 8B*

```
chmod 777 /ibm2/$i

#-----------------------------
# Perform NFS Mount from Server to Client
----------------------------- rsh $i "mkdir /ibm2"
rsh $i "chmod 777 /ibm2"
rsh $i "/usr/sbin/mount $svr421:/ibm2 /ibm2"
sleep 5
if [[ $? = 0 ]] then
        echo "Successful NFS mount to " $i
        echo "Successful NFS mount to " $i>>/$logfile else
        echo "Unsuccessful NFS mount to " $i
        echo "Unsuccessful NFS mount to " $i>>/$logfile
        exit 1
fi
###############################################
# Retrieve /home/local and Other information
###############################################

rsh $i '/usr/bin/du -k -s /home/local |cut -f1 d"/"'>/ibm2/$i/home.local.space
rsh $i '/usr/bin/du -k -s /usr/local/bin |cut -f1 -d"/"'>/ibm2/$i/usr.local.bin.space
rsh $i "tar -cpf/ibm2/$i/home.tar /home/local"
rsh $i "tar -cpf/ibm2/$i/usr.local.bin.tar /usr/local/bin"

rsh $i "cp -p /etc/.kshrc /ibm2/$i/etc.kshrc!'
rsh $i "cp -p /etc/uucp/Devices /ibm2/$i/uucp. Devices"
rsh $i "cp -p /etc/uucp/Dialcodes A bm2/$i/u ucp. Dial codes"
rsh $i "cp -p /etc/uucp/Dialers /ibm2/$i/uucp. Dialers"
rsh $i "cp -p /etc/uucp/Maxuuscheds /ibm2/$i/uucp.Maxuuscheds"
rsh $i "cp -p /etc/uucp/Maxuuxqts /ibm2/$i/uucp.Maxuuxqts"
rsh $i "cp -p /etc/uucp/Permissions /ibm2/$i/uucp.Permissions"
rsh $i "cp -p /etc/uucp/Poll /ibm2/$i/uucp. Poll"
rsh $i "cp -p /etc/uucp/Systems /ibm2/$i/uucp. Systems"

rsh $i "cp -p /etc/passwd /ibm2/$i/etc.passwd"
rsh $i "cp -p /etc/group /ibm2/$i/etc. group"
rsh $i "cp -p /etc/security/passwd /ibm2/$i/etc.security.passwd"
rsh $i "cp -p /etc/security/group /ibm2/$i/etc.security.group"
rsh $i "cp -p /etc/profile /ibm2/$i/etc. profile"
rsh $i "cp -p /etc/environment /ibm2/$i/etc.environment"
rsh $i "cp -p /usr/lpp/X1 1/defaults/xinitrc /ibm2/$i/X1 1.xinitrc"
rsh $i "cp -p /usr/lpp/X1 1/Motif1.2/app-defaults/system.mwmrc /ibm2/$i/X1 1. system. mwmrc"
```

FIG. 8C

```
##########################################
# Retrieve Network information
##########################################
#---------------------------
Get key network configuration files
--------------------------- rsh $i "/usr/bin/hostname" > /ibm2/$i/host.name
if [[ -a /ibm2/$i/host.name ]] then
print /ibm2/$i/host.name copied >> $logfile
else
print /ibm2/$i/host.name did not copy >>$logfile
fi rsh $i "cp -p /.rhosts /ibm2/$i/.rhosts"
if [[ -a /ibm2/$i/.rhosts ]] then
print /ibm2/$i/.rhosts copied >> $logfile
else
print /ibm2/$i/.rhosts did not copy >>$logfile
fi rsh $i "cp -p /etc/hosts.equiv /ibm2/$i/etc.hosts.equiv"
if [[ -a /ibm2/$i/etc.hosts.equiv ]] then
print /ibm2/$i/etc.hosts.equiv copied >> $logfile
else
print /ibm2/$i/etc.hosts.equiv did not copy >>$logfile
fi rsh $i "cp -p /etc/hosts /ibm2/$i/etc.hosts"
if [[ -a /ibm2/$i/etc.hosts ]] then
print /ibm2/$i/etc.hosts copied >> $logfile
else
print /ibm2/$i/etc.hosts did not copy >>$logfile
fi rsh $i "cp -p /etc/resolv.conf /ibm2/$i/etc.resolv.conf"
if [[ -a /ibm2/$i/etc.resolv.conf ]] then
print /ibm2/$i/etc.resolv.conf copied >> $logfile
else
print /ibm2/$i/etc.resolv.conf did not copy >>$logfile
fi rsh $i "cp -p /etc/rc.local /ibm2/$i/etc.rc.local"
if [[ -a /ibm2/$i/etc.rc.local ]] then
print /ibm2/$i/etc.rc.local copied >> $logfile
else
```

*FIG. 8D*

```
print /ibm2/$i/etc.rc.local did not copy >>$logfile
fi rsh $i "cp -p /etc/rc.net /ibm2/$i/etc.rc.net"
if [[ -a /ibm2/$i/etc.rc.net ]] then
print /ibm2/$i/etc.rc.net copied >> $logfile
else
print /ibm2/$i/etc.rc.net did not copy >>$logfile
fi rsh $i "cp -p /etc/rc.tcpip /ibm2/$i/etc.rc.tcpip"
if [[ -a /ibm2/$i/etc.rc.tcpip ]] then
print /ibm2/$i/etc.rc.tcpip copied >> $logfile
else
print /ibm2/$i/etc.rc.tcpip did not copy >>$logfile
fi rsh $i "cp -p /etc/services /ibm2/$i/etc.services"
if [[ -a /ibm2/$i/etc.services ]] then
print /ibm2/$i/etc.services copied >> $logfile
else
print /ibm2/$i/etc.services did not copy >>$logfile
fi

------------------------------
# Get Status of Ethernet Adapters
------------------------------ rcp -p $hdir/ethernet.status.script $i:/tmp/ethernet.status.script
rsh $i "/usr/bin/chmod 777 /tmp/ethernet.status.script"
rsh $i "/tmp/ethernet.status.script"
rsh $i "/usr/bin/chmod 777 /tmp/ether.state"
rcp -p $i:/tmp/ether.state /ibm2/$i/ether.state
rcp -p $i:/tmp/en_names2.list /ibm2/$i/en_names2.list
if [[ -a /ibm2/$i/en_names2.list ]] then
print /ibm2/$i/en_names2.list is copied >> $logfile
else
print /ibm2/$i/en_names2.list is not copied >> $logfile
fi

------------------------------
# Get IP addresses of Ethernet Adapters
------------------------------ for x in 'cat /ibm2/$i/en_names2.list'
```

FIG. 8E

```
do rsh $i /etc/ifconfig $x|grep inet|cut -f2 -d" " >/ibm2/$i/$x.addr
if [[ -a /ibm2/$i/$x.addr ]] then
        print "/ibm2/$i/$x.addr is copied">> $logfile
else
        print "/ibm2/$i/$x.addr is not copied">> $logfile
fi
done rsh $i '/etc/ifconfig en0|grep inet|cut -f2 -d" "'>/ibm2/$i/en0.addr
if [[ -a /ibm2/$i/en0.addr ]] then
print /ibm2/$i/en0.addr is copied >> $logfile
else
print /ibm2/$i/en0.addr is not copied >> $logfile
fi rsh $i '/etc/ifconfig en1|grep inet|cut -f2 d" "'>/ibm2/$i/en1.addr
if [[ -a /ibm2/$i/en1.addr ]] then
print /ibm2/$i/en1.addr is copied >> $logfile
else
print /ibm2/$i/en1.addr is not copied >> $logfile
fi

#-----------------------------
Get default gateway addresses
----------------------------- rsh $i "/usr/bin/netstat -rn|grep default|grep UG|cut -c14-30">/ibm2/$i/dgw_addr if [[ -a /ibm2/$i/dgw_addr ]] then
print /ibm2/$i/dgw_addr is copied >> $logfile
else
print /ibm2/$i/dgw_addr is not copied >> $logfile
fi

#-----------------------------
Get default netmasks
----------------------------- for x in 'cat /ibm2/$i/en_names2.list'
do
rsh $i /etc/ifconfig $x|grep netmask|cut -f4 -d" " >/ibm2/$i/$x.netmask
if [[ -a /ibm2/$i/$x.netmask ]] then
        print "/ibm2/$i/$x.netmask is copied">> $logfile
```

*FIG. 8F*

```
            else
                 print "/ibm2/$i/$x.netmask is not copied">> $logfile
            fi
done rsh $i '/etc/ifconfig en0|grep netmask|cut -f4 -d" "'>/ibm2/$i/en0.netmask

if [[ -a /ibm2/$i/en0.netmask ]] then
print /ibm2/$i/en0.netmask is copied >> $logfile
else
print /ibm2/$i/en0.netmask is not copied >> $logfile
fi

rsh $i '/etc/ifconfig en1|grep netmask|cut -f4 -d" "'>/ibm2/$i/en1.netmask

if [[ -a /ibm2/$i/en1.netmask ]] then
print /ibm2/$i/en1.netmask is copied >> $logfile
else
print /ibm2/$i/en1.netmask is not copied >> $logfile
fi

#--------------------------
Get domain information: domainname and
# nameserver address
-------------------------- rsh $i "/usr/bin/domainname">/ibm2/$i/dom_name rsh $i "head -2 /etc/resolv.conf">/ibm2/$i/domain1.tmp rsh $i "tail -1 /ibm2/$i/domain1.tmp">/ibm2/$i/domain2.tmp
chmod 777 /ibm2/$i/domain2.tmp
rsh $i "cat /ibm2/$i/domain2.tmp|cut -f2 -d' '" >/ibm2/$i/dom_addr if [[ -a /ibm2/$i/dom_name ]] then
print /ibm2/$i/dom_name is copied >> $logfile
else
print /ibm2/$i/dom_name is not copied >> $logfile
fi if [[ -a /ibm2/$i/dom_addr ]] then
print /ibm2/$i/dom_addr is copied >> $logfile
else
print /ibm2/$i/dom_addr is not copied >> $logfile
fi

```
# Retrieve System Information
############################################ rsh $i "tar -cpf/ibm2/$i/system.tar /var/spool/cron/crontabs"
rsh $i "cp -p /etc/inittab /ibm2/$i/etc.inittab"
rsh $i "/etc/lsitab -a">/ibm2/$i/lsitab.out
rsh $i "cp -p /var/spool/cron/crontabs/adm /ibm2/$i/var.spool.cron.crontabs.adm"
rsh $i "cp -p /var/spool/cron/crontabs/root /ibm2/$i/var.spool.cron.crontabs.root"
rsh $i "cp -p /var/spool/cron/crontabs/sys /ibm2/$i/var.spool.cron.crontabs.sys"
rsh $i "cp -p /var/spool/cron/crontabs/uucp /ibm2/$i/var.spool.cron.crontabs.uucp"
rsh $i "/usr/bin/crontab -l" > /ibm2/$i/crontab.l rsh $i "cp -p /etc/filesystems /ibm2/$i/etc.filesystems"
rsh $i "cd /var/spool/cron/crontabs"

if [[ -a /ibm2/$i/cron2.list ]] then
        rsh $i "/usr/bin/rm /ibm2/$i/cron2.list"
fi rsh $i "/usr/bin/ls /var/spool/cron/crontabs">/ibm2/$i/cron1.list
rsh $i "grep -v -E 'root|sys|uucp' /ibm2/$i/cron1.list">/dev/null
if [[ $? = 0 ]] then
        rsh $i "grep -v -E 'root|sys|uucp' /ibm2/$i/cron1.list" > /ibm2/$i/cron2.list
        for x in 'cat /ibm2/$i/cron2.list'
        do
                rsh $i "cp-p/var/spool/cron/crontabs/$x/ibm2/$i/var.spool.cron.crontabs.$x"
        done
fi if [[ -a /ibm2/$i/etc.inittab ]] then
print /ibm2/$i/etc.inittab is copied >> $logfile
else
print /ibm2/$i/etc.inittab is not copied >> $logfile
fi if [[ -a /ibm2/$i/lsitab.out ]] then
print /ibm2/$i/lsitab.out is copied >> $logfile
else
print /ibm2/$i/lsitab.out is not copied >> $logfile
fi if [[ -a /ibm2/$i/var.spool.cron.crontabs.root ]] then
print /ibm2/$i/var.spool.cron.crontabs.root is copied >> $logfile
else
print /ibm2/$i/var.spool.cron.crontabs.root is not copied >> $logfile
fi if [[ -a /ibm2/$i/crontab.l ]] then
```

*FIG. 8H*

```
print /ibm2/$i/crontab.l is copied >> $logfile
else
print /ibm2/$i/crontab.l is not copied >> $logfile
fi if [[ -a /ibm2/$i/cron2.list ]] then
print /ibm2/$i/cron2.list is copied >> $logfile
else
print ibm2/$i/cron2.list is not copied >> $logfile
fi

###############################################
# Retrieve TTY Information
######################################### rsh $i "/etc/lsdev -C -c tty |cut -f1 d' "'>/ibm2/$i/tty_name.list tottty='/usr/bin/wc -c /ibm2/$i/tty_name.list|cut -c 7-8' if [[ -a /ibm2/$i/tty_attr.data ]] then
        rsh $i "/usr/bin/rm /ibm2/$i/tty_attr.data"
fi if [[ -a /ibm2/$i/tty_attr2.data ]] then
        rsh $i "/usr/bin/rm /ibm2/$i/tty_attr2. data"
fi if [[ $tottty -ne 0 ]] then
        for x in 'cat /ibm2/$i/tty_name.list'
        do
        rsh $i "/etc/lsattr -l $x -E -O -a 'speed term login'">/ibm2/$i/tty_attr.data
        rsh $i "echo 'grep -v -E '#' /ibm2/$i/tty_attr.data':$x" >>/ibm2/$i/tty_attr2.data
        done
fi if [[ -a /ibm2/$i/tty_attr2.data ]] then
        rsh $i '/etc/lsdev -C -c tty|cut -f3 -d" "|cut -f3 -d"-"'>/ibm2/$i/port_number.data
        rsh $i '/etc/lsdev -C|grep sa|cut -f1 -d" "'>/ibm2/$i/parent_adapter.data
        rsh $i "/usr/bin/paste /ibm2/$i/tty_name.list /ibm2/$i/parent_adapter.data
/ibm2/$i/port_number.data /ibm2/$i/tty_attr2.data >/ibm2/$i/fulltty1.data"
        rsh $i "/usr/bin/grep tty /ibm2/$i/fulltty1.data">/ibm2/$i/fulltty.data
fi

###############################################
# Retrieve Print Queue Information
###############################################
```

*FIG. 81*

```
rsh $i "/usr/bin/lpstat >/ibm2/$i/lpstat.data"
rsh $i "cp -p /etc/qconfig /ibm2/$i/etc.qconfig"
rsh $i "/usr/bin/lsallq > /ibm2/$i/que.info"
rsh $i "/usr/bin/lsallq -c > /ibm2/$i/quedev.info"
rsh $i "/etc/lsdev -C -c printer -F 'name class type' >/ibm2/$i/printer.info"
rsh $i "/usr/bin/cat /ibm2/$i/printer.info|/usr/bin/cut -f1 ">/ibm2/$i/printer_names.list if [[ -a /ibm2/$i/etc.qconfig ]] then
print /ibm2/$i/etc.qconfig is copied >> $logfile
else
print /ibm2/$i/etc.qconfig is not copied >> $logfile
fi if [[ -a /ibm2/$i/printer.info ]] then
print /ibm2/$i/printer.info is copied >> $logfile
else
print /ibm2/$i/printer.info is not copied >> $logfile
fi if [[ -a /ibm2/$i/printer_names.list ]] then
print /ibm2/$i/printer_names.list is copied >> $logfile
else
print /ibm2/$i/printer_names.list is not copied >> $logfile
fi if [[ -a /ibm2/$i/printer_attr.data ]] then
print /ibm2/$i/printer_attr.data is copied >> $logfile
else
print /ibm2/$i/printer_attr.data is not copied >> $logfile
fi

##############################################
# Retrieve Application-Specific Information
##############################################

#---------------------------------
# Get ADSM include/exclude information
#---------------------------------
#echo "Getting ADSM include/exclude information"
#sleep 10
rsh $i "cp -p /usr/lpp/adsm/bin/inclexcl.def /ibm2/$i/inclexcl.def"
if [[ -a /ibm2/$i/inclexcl.def]] then
print /ibm2/$i/inclexcl.def is copied >> $logfile
else
print /ibm2/$i/inclexcl.def is not copied >> $logfile
```

------------------------------
# Get WordPerfect 6.0 license information
#------------------------------
rsh $i ls /usr/lpp/wp60/shlib10/license.dat >/dev/null
    if [[ $? = 0 ]] then
            rsh $i "cp -p /usr/lpp/wp60/shlib10/license.dat/ibm2/$i/wp60.lic.dat"
    fi

------------------------------
# Get Island Office license information
------------------------------ rsh $i ls /usr/lpp/ioffice_4.1/licenses/netlicense.dat >/dev/null
    if [[ $? = 0 ]] then
            rsh $i "cp p /usr/lpp/ioffice_4.1/licenses/netlicense.dat /ibm2/$i/iof.netlic.dat"
    fi if [[ -a /ibm2/$i/iof.netlic.dat ]] then
print /ibm2/$i/iof.netlic.dat is copied >> $logfile
else
print /ibm2/$i/iof.netlic.dat is not copied >> $logfile
fi

------------------------------
# Get Wingz license information
------------------------------ rsh $i ls /usr/lpp/WingzFiles/printer.info >/dev/null
    if [[ $? = 0 ]] then
            rsh $i "cp -p /usr/lpp/Wingz/WingzFiles/printer.info /ibm2/$i/wingz.printer.info"
    fi if [[ -a /ibm2/$i/wingz.printer.info ]] then
print /ibm2/$i/wingz.printer.info is copied >> $logfile
else
print /ibm2/$i/wingz.printer.info is not copied >> $logfile
fi

------------------------------
# Get SoftWindows1 license information and hard drive
#------------------------------
rsh $i df|grep SoftWindows >/dev/null
```

*FIG. 8K*

```
        if [[ $? = 0 ]] then
                rsh $i "cp -p /usr/lpp/SoftWindows/FLEXlm/license.dat /ibm2/$i/softwin1.license.dat"
            rcp -p $i:/usr/lpp/SoftWindows/*.hdf /ibm2/$i
                rcp -p $hdir/fs_softwin1.script $i:/tmp/fs_softwin1.script
                rsh $i "chmod 777 /tmp/fs_softwin1.script"
                rsh $i "/tmp/fs_softwin1.script"
                rsh $i "chmod 777 /tmp/fs.softwin.sizes"
                rcp $i:/tmp/fs.softwin.sizes /ibm2/$i/fs.softwin.sizes
        fi

#---------------------------
# Get SoftWindows2 license information and hard drive
--------------------------- rsh $i df|grep SoftWindows2 >/dev/null
        if [[ $? = 0 ]] then
                rsh $i "cp -p /usr/SoftWindows2/FLEXlm/license.dat /ibm2/$i/softwin2.license.dat"
            rcp -p $i:/usr/SoftWindows2/*.hdf /ibm2/$i
                rcp -p $hdir/fs_softwin.script $i:/tmp/fs_softwin.script
                rsh $i "chmod 777 /tmp/fs_softwin.script"
                rsh $i "/tmp/fs_softwin.script"
                rsh $i "chmod 777 /tmp/fs.softwin.sizes"
                rcp -p $i:/tmp/fs.softwin.sizes /ibm2/$i/fs.softwin.sizes
        fi

###########################################
# Unmount the files, clean up and leave #
###########################################
rsh $i "cd /"
rsh $i "/etc/umount /ibm2"
sleep 5
rsh $i "/etc/mount |grep nimsvr"
if [[ $? != 0 ]] then
echo $i "nimsvr not unmounted"
echo $i "nimsvr not unmounted">>$logfile
fi
done $hdir/create.checklist.script
```

FIG. 8L

FIG. 9 ibmw500
ibmw501
ibmw502
ibmw503
ibmw504
ibmw505
ibmw506
ibmw507
ibmw508
ibmw509
ibmw550

```
!/bin/ksh
# Name: restore.full.script
##########################################

#----------------------
# Get Some Basic Information: IP Address
#     Netmask, Hostname, Gateway
#----------------------
# Obtain the name as a loading workstation, then obtain the name of the
# workstation to be replaced
#----------------------

ans=n
while [ $ans = n ]
do
print " Please Enter the test name of this Workstation."
print " Use the Test name, i.e., nimload2,etc."
read tempname print " You entered $tempname. Is this correct? y/n:"
read ans
if [[ $ans != y ]] then
        print "If at first you don't succeed, try again."
        ans='n'
fi
done

#----------------------
# Get the temporary IP address for this workstations
#----------------------
echo " "
echo " "
ans=n
while [ $ans = n ]
do
print " Please Enter the IP address of this Workstation."
print " Use the Test IP address, i.e., 128.100.100.102,etc."

read tempip print " You entered $tempip. Is this correct? y/n:"
read ans
```

*FIG. 10A*

```
if [[ $ans != y ]] then
        print "If at first you don't succeed, try again."
        ans='n'
fi
done
#----------------------
# Get the name of the workstation to be replaced
#----------------------

ans=n
while [ $ans = n ]
do
        print "NOW ENTER THE PERMANENT NAME OF THIS WORKSTATION"
        print
        print " for example, ibmw320, ibmw424, ibmw022, etc."
        print
        read newhost
        print "You entered $newhost. Is this correct? y/n:"
        read ans
        if [[ $ans != y ]] then
                print "Wrong answer, please try again"
                ans='n'
        fi done ans=n
while [ $ans = n ]
do
        print "NOW ENTER THE permanent IP address"
        print
        read newip
        print "You entered $newip. Is this correct? y/n:"
        read ans
        if [[ $ans != y ]] then
                print "Wrong answer, please try again"
                ans='n'
        fi done
clear
echo "One last time for verification"
echo " "
echo $tempname "is the temporary name for this workstation"
```

*FIG. 10B*

```
echo " "
echo $tempip "is the temporary IP address for this workstation"
echo " "
echo $newhost "is the permanent name for this workstation"
echo " "
echo $newip "is the permanent IP address for this workstation"
echo " "
echo "Press ENTER to continue"
read zzz
i=$newhost
export $i

#---------------------
# Connect "New" Client to NIM Server
#---------------------
if [[ -a /etc/resolv.conf ]] then
mv -f /etc/resolv.conf /etc/back.resolv.conf
fi echo "128.100.100.99 nimsvr">>/etc/hosts
mktcpip -h $tempname -a $tempip -m'255.255.255.0' -i'en0' -g'128.100.100.99' -t'bnc'
cd /
mkdir /ibm2
mkdir /ibm
mount nimsvr:/ibm2 /ibm2
mount nimsvr:/ibm /ibm
mount|grep nimsvr>/dev/null echo "Connect "New" Client to NIM Server"
echo "press enter to continue"
read zzz
#if [[ #? != 0 ]] then
#exit 1
fi

#---------------------
# Restore networking files
# - make new /etc/hosts file for workstation
# - copy /etc/resolv.conf to workstation
# - copy /etc/rc.local to workstation
# - make new /etc/rc.net file for workstation
#---------------------
hdir=/home/slipton/gtetools
```

FIG. 10C

```
---- /etc/hosts ----- cp -p /etc/hosts /tmp/etc.hosts.bak
cp -p /ibm2/$i/etc.hosts /tmp/etc.hosts
head -52 /etc/hosts>/tmp/new.host.banner
x='wc -l /tmp/etc.hosts|cut -c7-8'
let z=$x-38
tail -$z /tmp/etc.hosts>/tmp/old.hosts
cat /tmp/old.hosts>>/tmp/new.host.banner
echo "128.100.100.99 nimsvr">>/tmp/new.host.banner
cp -p /tmp/new.host.banner /etc/hosts
echo "$ipaddr $name">>/etc/hosts echo "# ---- Restoring /etc/hosts -----"
echo "press enter to continue"
read zzz

---- /etc/hosts.equiv ---- cp -p /ibm2/$i/etc.hosts.equiv /tmp/etc.hosts.equiv
cp -p /etc/hosts.equiv /tmp/etc.hosts.equiv.bak
cp -p /tmp/etc.hosts.equiv /etc/hosts.equiv echo "# ---- Restoring /etc/hosts.equiv -----"
echo "press enter to continue"
read zzz

---- Restoring /etc/rc.local file"

cp -p /ibm2/$i/etc.rc.local /tmp/etc.rc.local
cp -p /etc/rc.local /tmp/etc.rc.local.bak
cp -p /tmp/etc.rc.local /etc/rc.local echo "# ---- Restoring /etc/rc.local -----"
echo "press enter to continue"
read zzz
---- /etc/rc.net ---- cp -p /etc/rc.net /tmp/etc.rc.net.bak
head -15 /etc/rc.net >/tmp/etc.rc.net
egrep -v "#!/bin/ksh|loclust" /ibm2/$i/etc.rc.net >> /tmp/etc.rc.net
```

*FIG. 10D*

```
cp /tmp/etc.rc.net /etc/rc.net echo " restoring /etc/rc.net"
echo "press enter to continue"
read zzz

---- /etc/rc.nfs ---- cp -p /etc/rc.nfs /tmp/etc.rc.nfs.bak
cp -p $hdir/rc.nfs.org /etc/rc.nfs echo " restoring /etc/rc.nfs"
echo "press enter to continue"
read zzz

#------------------------
# Copy /etc/uucp/* to workstation
------------------------ cp -p /etc/uucp/D* /tmp
cp -p /ibm2/$i/uucp.Devices /tmp/uucp.Devices
cp -p /ibm2/$i/uucp.Dialcodes /tmp/uucp.Dialcodes
cp -p /ibm2/$i/uucp.Dialers /tmp/uucp.Dialers
cp -p /ibm2/$i/uucp.Systems /tmp/uucp.Systems
cp -p /ibm2/$i/uucp.Devices /etc/uucp/Devices
cp -p /ibm2/$i/uucp.Dialcodes /etc/uucp/Dialcodes
cp -p /ibm2/$i/uucp.Dialers /etc/uucp/Dialers
cp -p /ibm2/$i/uucp.Systems /etc/uucp/Systems echo " restoring /etc/uucp/D*"
echo "press enter to continue"
read zzz

---- /var/spool/cron/crontabs/root ---- cp -p /var/spool/cron/crontabs/root /tmp/var.spool.cron.crontabs. root.bak
grep -v -E "#|errclear|diagnostics|skulker" /ibm2/$i/crontab.l>/tmp/cronfile2.list
chmod 777 /tmp/cronfile2.list
cat /tmp/cronfile2.list>>/var/spool/cron/crontabs/root echo " restoring /crontabs/root"
```

FIG. 10E

```
echo "press enter to continue"
read zzz

---- /var/spool/cron/crontabs/others ---- if [[ -a /ibm2/$i/cron2.list ]] then
cp -p /ibm2/$i/cron2.list /tmp/cron2.list for x in 'cat /tmp/cron2.list'
do
cp -p /ibm2/$i/var.spool.cron.crontabs.$x /var/spool/cron/crontabs/$x
chmod 0644 /var/spool/cron/crontabs/$x if [[ $x = adm ]] then
chown $x:cron /var/spool/cron/crontabs/$x
else
chown root:cron var/spool/cron/crontabs/$x
fi done fi
echo " restoring /crontabs/others"
echo "press enter to continue"
read zzz

---- /etc/filesystems ---- cp -p /etc/filesystems /tmp/etc.filesystems.bak echo " restoring /etc/filesystems"
echo "press enter to continue"
read zzz

---- /etc/inittab ---- cp -p /ibm2/$i/lsitab.out /tmp/lsitab.out
cp -p /etc/inittab /tmp/etc.inittab.bak
grep -v -f $hdir/init.exclude.list /tmp/lsitab.out>/tmp/new.itab.out
cp -p $hdir/inittab.org /etc/inittab
cat /tmp/new.itab.out>>/etc/inittab echo " restoring /etc/inittab"
```

FIG. 10F

```
echo "press enter to continue"
read zzz

#--------------------
# Restore unique system information
#  - make new /etc/passwd file
#  - make new /etc/security/passwd file
#  - make new /etc/group file
#  - make new /etc/security/group file
#  - copy system.mwmrc to workstation
#  - copy /etc/profile to workstation
#  - make new /etc/inittab file
#  - make new /var/spool/cron/crontabs/root file
#--------------------

---- /etc/passwd ---- cp -p /etc/passwd /tmp/etc.passwd.bak
cp -p /ibm2/$i/etc.passwd /tmp/etc.passwd
cp -p /tmp/etc.passwd /etc/passwd echo " restoring /etc/passwd"
echo "press enter to continue"
read zzz

---- /etc/security/passwd ---- cp -p /etc/security/passwd /tmp/etc.security.passwd.bak
cp -p /ibm2/$i/etc.security.passwd /tmp/etc.security.passwd
cp -p /tmp/etc.security.passwd /etc/security/passwd echo " restoring /etc/security/passwd"
echo "press enter to continue"
read zzz

---- /etc/group ---- cp -p /etc/group /tmp/etc.group.bak
cp -p /ibm2/$i/etc.group /tmp/etc.group
tail -2 /etc/group >>/tmp/etc.group
cp -p /tmp/etc.group /etc/group
```

*FIG. 10G*

```
echo " restoring /etc/group"
echo "press enter to continue"
read zzz

---- /etc/security/group ---- cp -p /ibm2/$i/etc.security.group /tmp/etc.security.group
cp -p /etc/security/group /tmp/etc.security.group.bak
tail -5 /etc/security/group >>/tmp/etc.security.group
cp -p /tmp/etc.security.group /etc/security/group echo " restoring /etc/security/group"
echo "press enter to continue"
read zzz

---- /system.mwmrc file ---- echo " beginning restore of system.mwmrc "
echo "press enter to continue"
read zzz cp -p /ibm2/$i/X11.system.mwmrc /tmp/X11.system.mwmrc
cp -p /usr/lpp/X11/defaults/Motif1.2/system.mwmrc /tmp/system.mwmrc.bak
cp -p /usr/lpp/X11/defaults/Motif1.2/system.mwmrc
/usr/lpp/X11/defaults/Motif1.2/system.mwmrc.325
source_mwmrc=/tmp/X11.system.mwmrc
export source_mwmrc
output_mwmrc=/tmp/X11.system.mwmrc.new
export output_mwmrc
sed_script=/home/slipton/gtetools/menutools/mwmrc.sed
export sed_script
sed -f /home/slipton/gtetools/menutools/mwmrc.sed /tmp/X11.system.mwmrc
>/tmp/X11.system.mwmrc.new cp -p /tmp/X11.system.mwmrc.new /usr/lpp/X11/defaults/Motif1.2/system.mwmrc echo " restore of system.mwmrc "
echo "press enter to continue"
```

*FIG. 10H*

```
read zzz

------ /usr/lpp/X11/defaults/xinitrc --------- cp -p /ibm2/$i/X11.xinitrc /tmp/X11.xinitrc
cp -p /usr/lpp/X11/defaults/xinitrc /tmp/X11.xinitrc.bak
cp -p /tmp/X11.xinitrc /usr/lpp/X11/defaults/xinitrc echo "restore of /usr/lpp/X11/defaults/xinitrc"
echo " press enter to continue"
read zzz

#------------------------
# Restore /home/local file to workstation
#------------------------
cp -p /ibm2/$i/home.local.space /tmp/home.local.space
df -k /home|awk '{ print $3}'>/tmp/temp.home.free.space
tail -1 /tmp/temp.home.free.space>/tmp/home.free.space
let x='cat /tmp/home.local.space'
let y='cat /tmp/home.free.space'
if [[ $x -lt $y ]] then
        tar -xpvf/ibm2/$i/home.tar
else
        echo $i ":/home/local is too big for the allocated filesystem">>$logfile
fi echo " restore of /home/local "
echo "press enter to continue"
read zzz
#------------------------
# Restore of /usr/local/bin
#------------------------
cp -p /ibm2/$i/usr.local.bin.space /tmp/usr.local.bin.space df -k /usr|awk '{print $3}'>/tmp/temp.usr.free.space
tail -1 /tmp/temp.usr.free.space>/tmp/usr.free.space
let x='cat /tmp/usr.local.bin.space'
let y='cat /tmp/usr.free.space'
if [[ $x -lt $y ]] then
        tar -xvpf/ibm2/$i/usr.local.bin.tar
else
        echo $i ":/usr/local/bin is too big for the allocated filesystem">>$logfile
```

FIG. 10I

```
fi echo "Restore of /usr/local/bin"
echo "Press enter to continue"
read zzz

#----------------------
# ADSM Restore to workstation
# - copy ADSM inclexcl.def to workstation
---------------------- cp -p /ibm2/$i/inclexcl.def /usr/lpp/adsm/bin/inclexcl.def echo " restore of adsm include-exclude file "
echo "press enter to continue"
read zzz

------ Name: restore.softwindows.script ----------- mount nimsvr:/ibm /ibm

----------------------
# SoftWindows1 Restore
# - test for presence of SoftWindows
# - make SoftWindows lv and jfs
# - restore SoftWindows image
# - restore SoftWindows hdf file
# - copy demo license.dat file to workstation
---------------------- if [[ -a /ibm2/$i/softwin1.license.dat ]] then
        let freepp='lspv hdisk0|grep "FREE PPs:"|awk'{print $3}"
        exec 3</ibm2/$i/fs.softwin.sizes
        while read -u3 lvname mpt parts2
        do
          if [[ $parts2 -lt $freepp ]] then
            mklv -y'lvSwin'-a c rootvg $parts2
crfs -v jfs -d'lvSwin' -m'/usr/lpp/SoftWindows' -A"' locale yesstr | awk -F: '{print $1}'"
-p'rw' -t"'locale nostr | awk -F: '{print $1}'" -a frag='4096' -a nbpi='4096' -a ag='8'
```

*FIG. 10J*

```
            mount /dev/lvSwin cd /usr/lpp
               tar -xvpf/ibm/SoftWindows1.tar cp -p /ibm2/$i/*.hdf /usr/lpp/SoftWindows
               chmod 0666 /usr/lpp/SoftWindows/*.hdf
               cp -p /ibm2/$i/softwin1.license.dat /usr/lpp/SoftWindows/FLEXlm/license.dat echo " restore of softwindows1 "
               echo "press enter to continue"
               read zzz
            else
               echo "not enough space to restore SoftWindows1"
               echo "press enter to continue"
               read zzz
            fi
         done
fi

------------------------
# SoftWindows2 Restore
# - test for presence of SoftWindows
# - make SoftWindows lv and jfs
# - restore SoftWindows image
# - restore SoftWindows hdf file
# - copy demo license.dat file to workstation
------------------------ if [[-a /ibm2/$i/softwin2.license.dat]] then let freepp='lspv hdisk0|grep "FREE PPs:"|awk '{print $3}"
         echo " Restoring softwindows2 "
         exec 3</ibm2/$i/fs.softwin.sizes
         while read -u3 lvname mpt parts2
         do
            if [[ $parts2 -lt $freepp ]] then
            mklv -y'lvSwin2'-a c rootvg $parts2
crfs -v jfs -d'lvSwin2' m'/usr/SoftWindows2' -A"'locale yesstr | awk -F:'{print $1}'"" -prw
- t"'locale nostr | awk -F: '{print $1}'"" -a frag='4096'-a nbpi='4096' -a ag='8'
            mount /dev/lvSwin2 cd /usr
               tar -xvpf/ibm/SoftWindows2.tar
```

*FIG. 10K*

```
        cp -p /ibm2/$i/*.hdf /usr/SoftWindows2
        chmod 0666 /usr/SoftWindows2/*.hdf
        cp -p /ibm2/$i/softwin2.license.dat /usr/SoftWindows2/FLEXlm/license.dat echo " restore of softwindows2 "
        echo "press enter to continue"
        read zzz
        else
        echo "not enough space for SoftWindows2"
        echo "press enter to continue"
        read zzz
        fi
      done
fi

#----------------------
# Wings Restore to workstation
# - copy Wingz printer.info to workstation
---------------------- if [[ -a /ibm2/$i/wingz.printer.info ]] then
        cp -p /ibm2/$i/wingz.printer.info /usr/lpp/Wingz/WingzFiles/printer.info echo " restore of wingz "
        echo "press enter to continue"
        read zzz
fi

#----------------------
# WordPerfect 6.0 Restore to workstation
---------------------- if [[ -a /ibm2/$i/wp60.lic.dat ]] then
cp -p ibm2/$i/wp60.lic.dat /usr/lpp/wp60/shlib10/license.dat

#       echo " restore of wordperfect "
#       echo "press enter to continue"
read zzz
fi
```

*FIG. 10L*

```
#-----------------------------
# tty's Restore
# -make new tty's
#-----------------------------
if [[ -a /ibm2/$i/tty_attr2.data ]] then echo " restore of tty's
echo "press enter to continue"
read zzz cp -p /ibm2/$i/tty_name.list    /tmp/tty_name.list
cp -p /ibm2/$i/tty_attr2.data   /tmp/tty_attr2.data
cp -p /ibm2/$i/port_number.data /tmp/port_number.data
cp -p /ibm2/$i/parent_adapter.data /tmp/parent_adapter.data
cp -p /ibm2/$i/fulltty.data     /tmp/fulltty.data
tr'A-Z' 'a-z' </tmp/fulltty.data >/tmp/fulltty2.data
cp -p /tmp/fulltty.data  /tmp/fulltty.data.bak
cp -p /tmp/fulltty2.data /tmp/fulltty.data for x in `cat /tmp/tty_name.list`
do grep $x /tmp/fulltty.data>/tmp/$x_info.list
ttyname=`cat /tmp/$x_info.list|cut -c1-4`
echo $ttyname
ttyparent=`cat /tmp/$x_info.list|cut -c6-8`
echo $ttyparent
ttyport=`cat /tmp/$x_info.list|cut -c9-11`
echo $ttyport
ttyspeed=`cat /tmp/$x_info.list|cut -c12-31|cut -f1 -d":"`
echo $ttyspeed
ttytype=`cat /tmp/$x_info.list|cut -c12-31|cut -f2 -d":"`
echo $ttytype
ttylogin=`cat /tmp/$x_info.list|cut -c12-31|cut -f3 -d":"`
echo $ttylogin
#need to put in logic to test for ttylogin=disable, then use the short for
form of the command without login=$ttylogin if [[ $ttylogin = disable ]] then
mkdev -c tty -t tty -l $ttyname -s rs232 -p $ttyparent -w $ttyport else
```

*FIG. 10M*

```
mkdev -c tty -t tty -l $ttyname -s rs232 -p $ttyparent -w $ttyport -a login=$ttylogin fi done fi
------------------------
# Remote Printers Restore
# - make new /etc/qconfig file
# - make new remote printer queue
------------------------ cp -p /ibm2/$i/lpstat.data /tmp/lpstat.data
cp -p /etc/qconfig /tmp/etc.qconfig.bak
cp -p /ibm2/$i/etc.qconfig /tmp/etc.qconfig grep -v "*" /tmp/etc.qconfig | sed s/:// > /tmp/qconfig.data
grep "*" /etc/qconfig >/tmp/etc.qconfig.banner
cp -p /tmp/etc.qconfig.banner /etc/qconfig echo "restoring key printer files"
echo "press enter to continue"
read zzz

# Just in case delete the print queue
/usr/sbin/piomisc_base rmpq_generic 'lp0:lp0' 2>/dev/null

# Just in case delete the printer
rmdev -l 'lp0'-d' 2>/dev/null

# Just in case delete the Virtual Printer
rmvirprt -q lp0 -d lp0 2>/dev/null lsvirprt mkdev -c printer -t 'opp' -s 'parallel' -p 'ppa0' -w 'p' -a line='59' -a col='200000' exec 3</tmp/qconfig.data
while read -u3 a b c do
```

*FIG. 10N*

```
if [[ -n $a && $b != '=' ]] then
        qname=$a
fi if [[ $a = device && $b = '=' ]] then
 devname=$c
    if [[ -n $qname && $devname = "lp0" ]] then
        echo "Setting up a local print queue for $qname on $devname"
        /usr/lib/lpd/pio/etc/piomkpq -A 'local' -p 'generic' -d $devname -D ps -q $qname
        /usr/lib/lpd/pio/etc/piochpq -q $qname -d $devname -a sD='+'
        /usr/lib/lpd/pio/etc/piochpq -q $qname -d $devname -l '59'
    fi
fi if [[ $a = host && $b = '=' ]] then
    remhost=$c
fi if [[ $a = rq && $b = '=' ]] then
    remqueue=$c
    echo "Creating remote print queue dev=$devname host=$remhost remque=$remqueue"
    /usr/lib/lpd/pio/etc/piomisc_ext mkpq_remote_ext -q $qname -h $remhost -r $remqueue -t aix
    fi done
echo "done with printer reconfiguration"
print "Press ENTER to continue"
read zzz sleep 3

---------------------
# TONICS Restore to workstation
# - select version to install
#---------------------
# Waiting for Becky
#echo "Installing TONICS"
#echo "Press enter to continue"
read zzz
```

*FIG. 100*

```
/home/NIM/tonics/SCRIPTS/upd_tonics $newhost echo "Press enter to continue"
read zzz

#----------------------
# Change the IP addresses to the real ones
---------------------- echo "Now it's time to reset the IP addresses"
echo " and the hostname to the real ones"
echo " We will now bring down the interfaces and"
echo " rebuild the interfaces"
echo " Be prepared for the message to tell you to"
echo " disconnect from the network."

echo
echo
echo " Press enter to continue"
echo " or control-c to exit"
read zzz echo "copying host files to /tmp"
echo "press enter to continue"
read zzz cp -p /ibm2/$i/host.name      /tmp/host.name
cp -p /ibm2/$i/etc.resolv.conf /tmp/etc.resolv.conf
cp -p /ibm2/$i/ether.state    /tmp/ether.state
cp -p /ibm2/$i/en0.addr       /tmp/en0.addr
cp -p /ibm2/$i/en1.addr       /tmp/en1.addr
cp -p /ibm2/$i/dgw_addr       /tmp/dgw_addr
cp -p /ibm2/$i/en0.netmask    /tmp/en0.netmask
cp -p /ibm2/$i/en1.netmask    /tmp/en1.netmask
cp -p /ibm2/$i/dom_name       /tmp/dom_name
cp -p /ibm2/$i/dom_addr       /tmp/dom_addr
cp -p /ibm2/$i/en_names2.list /tmp/en_names2.list cat /tmp/ether.state echo "unmounting /ibm /ibm2 please wait"
echo "press enter to continue"
read zzz
```

*FIG. 10P*

```
umount /ibm
umount /ibm2
/etc/mount|grep nimsvr cp -p /tmp/etc.resolv.conf /etc/resolv.conf chmod 777 /tmp/*.list
chmod 777 /tmp/ether.state
cd / echo "Please disconnect the ethernet cable"

echo " or control-c to exit"
echo "Press enter to continue"
read xxx for x in 'cat /tmp/en_names2.list'
do
        ifconfig $x down
        rmdev -l $x -d
done

#-------
print "Let's see if the ethernet interfaces are still configured."
print " "

lsdev -C -c if
#/etc/route -n -f
print " "
print " "
print "We will now reconfigure the network adapters"
print "After network configuration, we will replace this"
print "workstation with the Old workstation"
print "
print "

echo "Press enter to continue"
print " "
read zzz
```

FIG. 10Q

```
exec 3</tmp/ether.state
while read -u3 enname upbit configbit
do

#---------
if [[ $upbit = 0 && $configbit = 0 ]] then
       # make new interface in the down state using
       # the mkdev command
         en_mask='cat /tmp/$enname.netmask'
         mkdev -c if -s EN -t en -a netaddr=0.0.0.0 -w $enname -a state=down -a
arp=on -a netmask=0x0 broadcast="
         #ifconfig $enname down
fi
-------- if [[ $upbit = 0 && $configbit = 1 ]] then
       # make new interface in the down state using the
       # mkdev command
       # make new IP configuration in the down state
       # using the mktcpip command
         en_mask='cat /tmp/$enname.netmask'
         en_addr='cat /tmp/$enname.addr'
         host_name='cat /tmp/host.name'
         domaddr='cat /tmp/dom_addr'
         domname='cat /tmp/dom_name'
         dgwaddr='cat /tmp/dgw_addr' mkdev -c if -s EN -t en -a netaddr=$en_addr -w $enname -a state=down -a
arp=on -a netmask=$en_mask mktcpip -h $host_name -a $en_addr -m $en_mask -i $enname -n $domaddr
-d $domname -g $dgwaddr -t bnc
fi
#---------
if [[ $upbit = 1 && $configbit = 0 ]] then
       # make new interface in the up state using
       # the mkdev command
       #
         en_mask='cat /tmp/$enname.netmask'
         en_addr='cat /tmp/$enname.addr' mkdev -c if -s EN -t en -a netaddr=0.0.0.0 -w $enname -a state=up -a
arp=on -a netmask=0x0 broadcast="
         #ifconfig $enname up
```

FIG. 10R

```
fi
-------- if [[ $upbit = 1 && $configbit = 1 ]] then
   # make new interface in the up state using the
   # mkdev command
   # make new IP configuration in the up state
   # using the mktcpip command en_mask='cat /tmp/$enname.netmask'
        en_addr='cat /tmp/$enname.addr'
        host_name='cat /tmp/host.name'
        domaddr='cat /tmp/dom_addr'
        domname='cat /tmp/dom_name'
        dgwaddr='cat /tmp/dgw_addr' mkdev -c if -s EN -t en -a netaddr=0.0.0.0 -w $enname -a state=up -a
arp=on -a netmask=$en_mask mktcpip -h $host_name -a $en_addr -m $en_mask -i $enname -n $domaddr -d
$domname -g $dgwaddr -t bnc
fi
-------- done

-----------------------
# Re-set the permissions of key files
----------------------- echo "Re-setting the permissions of key files"
echo "Press enter to continue"
read zzz exec 3</home/slipton/gtetools/menutools/perms.list
while read -u3 fname fmod fown fgroup
do
chmod $fmod $fname
chown $fown $fname
```

*FIG.10S*

```
chgrp $fgroup $fname
done

#----------------------
# Disable the Monitor Timeout
---------------------- echo "Disabling the monitor timeout"
echo "Press enter to continue"
read zzz pmctrl -d lft0 -t 0 90 360

----------------------
# Increase the maxuproc from 40 to 100
#----------------------
chdev -l sys0 -a maxuproc='100'

#----------------------
# Increase the mbuf from 0 to 100
#----------------------
chdev -l sys0 -a maxmbuf='100'

#----------------------
# Change the Wordperfect license.dat file
#----------------------
./etc/environment
./etc/profile
myhost='hostname'
ed /usr/lpp/wp60/shlib10/license.dat<<endodata >/dev/null 2>&1
g/ibmw020/s//${myhost}
w
q
endodata

#----------------------
# Clean up and end
#----------------------
cd /tmp
```

FIG. 10T

```
                                    rm  *
                                    cd  /home
                                    rm  -fr  slipton /usr/bin/errclear 00

>  /var/adm/wtmp

>  /var/adm/sulog

>  /etc/security/failedlogin rm  -f  /smit.*

/etc/.kshrc 0755 root sys           #----------------------------
/etc/filesystems 0664 root sys      #
/etc/group 0664 root security       #----------------------------
/etc/hosts 0644 root sys
/etc/hosts.equiv 0664 root sys              FIG. 10U
/etc/inittab 0644 root sys
/etc/passwd 0664 root security
/etc/profile 0644 root sys
/etc/qconfig 0664 root printq
/etc/rc.local 0700 root sys
/etc/rc.net 0554 bin bin
/etc/rc.nfs 0755 root sys
/etc/resolv.conf 0644 root sys
/etc/security/group 0640 root security
/etc/security/passwd 0600 root security
/etc/uucp/Devices 0444 uucp uucp
/etc/uucp/Dialcodes 0400 uucp uucp
/etc/uucp/Dialers 0444 uucp uucp
/etc/uucp/Systems 0400 uucp uucp
/usr/lpp/adsm/bin/dsm.sys 0744 root system
/usr/lpp/adsm/bin/dsm.opt 0744 root system
/usr/lpp/adsm/bin/inclexcl.def 0644 root system
/usr/lpp/wingz/WingzFiles/printer.info 0644 root sys
/usr/lpp/wp60/shlib10/license.dat 0644 root sys
/usr/lpp/X11/defaults/xinitrc 0755 bin bin
/usr/lpp/X11/defaults/Motif1.2/system.mwmrc 0644 root sys
/usr/lpp/SoftWindows/FLEXlm/license.dat 0644 root system
/usr/SoftWindows2/FLEXlm/license.dat 0644 root system
/var/spool/cron/crontabs/root 0440 root cron
/var/spool/cron/crontabs/adm 0644 adm cron
```

FIG. 12

```
/New Window/{
s/aixterm -sb -sl 1024/aixterm -sb -sl 1024 -T \$XTITLE/
}
/End Session/{
s/f.exec ["]kill 0; kill -9 \$\$["]/f.quit_mwm/
}
/Landscape-RV/{
s/export LIBPATH=\/usr\/lpp\/X11\/lib:\/usr\/lib:\/lib; //
s/device ps/device ps -cutoff 50/
}
/Portrait-RV/{
s/export LIBPATH=\/usr\/lpp\/X11\/lib:\/usr\/lib:\/lib ; //
s/device ps/device ps -cutoff 50/
}
/Landscape["]/{
s/export LIBPATH=\/usr\/lpp\/X11\/lib:\/usr\/lib:\/lib ; //
s/device ps/device ps -cutoff 50/
}
/Portrait["]/{
s/export LIBPATH=\/usr\/lpp\/X11\/lib:\/usr\/lib:\/lib ; //
s/device ps/device ps -cutoff 50/
}
```

FIG. 11

```
#! /bin/ksh
/usr/bin/ls -al /usr/SoftWindows2|grep -v drwx|grep -v total>/tmp/lsal.out
z=0
for i in 'cat /tmp/lsal.out|awk '{print $5}''
do
let z=z+i
done
x='/usr/bin/du -k -s /usr/SoftWindows2|awk '{print $1}''
let x=x*1000
let y=x+z
let yy=y/1000
let yyy=yy/4096+2
lvname='/usr/bin/df | grep Soft | awk '{print $1}''
mpt='/usr/bin/df | grep Soft | awk '{print $7}''
echo $lvname " " $mpt " " $yyy>/tmp/fs.softwin.sizes
```

FIG. 13

METHOD AND SYSTEM FOR IMPLEMENTING NETWORK FILESYSTEM-BASED CUSTOMIZED COMPUTER SYSTEM AUTOMATED REBUILD TOOL

BACKGROUND OF THE INVENTION

1. Technical Field

The present invention relates to information processing technology. More particularly the present invention relates to a system and method for simplifying rebuilding a system following a failure.

2. Description of Related Art

The UNIX operating system is a multi-user operating system supporting serial or network connected terminals for more than one user. It supports multi-tasking and a hierarchical directory structure for the organization and maintenance of files. UNIX is portable, requiring only the kernel (<10%) written in assembler, and supports a wide range of support tools including development, debuggers, and compilers.

The UNIX operating system consists of the kernel, shell, and utilities. The kernel schedules tasks, manages data/file access and storage, enforces security mechanisms, and performs all hardware access. The shell presents each user with a prompt, interprets commands typed by a user, executes user commands, and supports a custom environment for each user. Finally, the utilities provide file management (rm, cat, ls, rmdir, mkdir), user management (passwd, chmod, chgrp), process management (kill, ps), and printing (lp, troff, pr).

A multi-user operating system allows more than one user to share the same computer system at the same time. It does this by time-slicing the computer processor at regular intervals between the various people using the system. Each user gets a set percentage of some amount of time for instruction execution during the time each user has the processor. After a user's allotted time has expired, the operations system intervenes, saving the program's state (program code and data), and then starts running the next user's program (for the user's set percentage of time). This process continues until, eventually, the first user has the processor again.

It takes time to save/restore the program's state and switch from one program to another (called dispatching). This action is performed by the kernel and must execute quickly, because it is important to spend the majority of time running user programs, not switching between them. The amount of time that is spent in the system state (i.e., running the kernel and performing tasks like switching between user programs) is called the system overhead and should typically be less than 10%.

Switching between user programs in main memory is done by part of the kernel. Main system memory is divided into portions for the operating system and user programs. Kernel space is kept separate from user programs. Where there is insufficient main memory to run a program, some other program residing in main memory must be written out to a disk unit to create some free memory space. A decision is made about which program is the best candidate to swap out to disk. This process is called swapping. When the system becomes overloaded (i.e., where there are more people than the system can handle), the operating system spends most of its time shuttling programs between main memory and the disk unit, and response time degrades.

In UNIX operating systems, each user is presented with a shell. This is a program that displays the user prompt, handles user input, and displays output on the terminal. The shell program provides a mechanism for customizing each user's setup requirements and storing this information for re-use (in a file called profile).

When the UNIX operating system starts up, it also starts a system process (getty), which monitors the state of each terminal input line. When getty detects that a user has turned on a terminal, it presents the logon prompt; and once the password is validated, the UNIX system associates the shell program (such as sh) with that terminal (typically there are a number of different shells including ksh and csh). Each user interacts with sh, which interprets each command typed. Internal commands are handled within the shell (set, unset); external commands are invoked as programs (ls, grep, sort, ps).

Multi-tasking operating systems permit more than one program to run at once. This is done in the same way as a multi-user system, by rapidly switching the processor between the various programs. OS/2, available from IBM Corporation, One New Orchard Road, Armonk, N.Y. 10504; and Windows 95, available from Microsoft Corporation, One Microsoft Way, Redmond, Wash. 98052, are examples of multi-tasking single-user operating systems. UNIX is an example of a multi-tasking multi-user operating system. A multi-user system is also a multi-tasking system. This means that a user can run more than one program at once using key selections to switch between them. Multi-tasking systems support foreground and background tasks. A foreground task is one the user interacts directly with using the keyboard and screen. A background task is one that runs in the background and does not have access to the screen or keyboard. Background tasks include operations like printing, which can be spooled for later execution.

The role of the operating system is to keep track of all the programs, allocating resources like disks, memory, and printer queues as required. To do this, it must lensure that one program does not get more than its fair share of the computer resources. The operating system does this by two methods: scheduling priority and system semaphores. Each program is assigned a priority level. Higher priority tasks (like reading and writing to the disk) are performed more regularly. User programs may have their priority adjusted dynamically, upwards, or downwards, depending upon their activity and available system resources. System semaphores are used by the operating system to control system resources. A program can be assigned a resource by getting a semaphore (via a system call to the operating system). When the resource is no longer needed, the semaphore is returned to the operating system, which can then allocate it to another program.

Disk drives and printers are serial in nature. This means that only one request can be performed at any one time. In order for more than one user to use these resources at once, the operating system manages them via queues. Each serial device is associated with a queue. When a user program wants access to the disk, i.e., it sends the request to the queue associated with the disk. The operating system runs background tasks (called daemons), which monitor these queues and service requests from them. A request is then performed by this daemon process, and the results are sent back to the user's program.

Multi-tasking systems provide a set of utilities for managing processes. In UNIX, these are ps (list processes), kill (kill a process), and (run a process in the background). In UNIX, all user programs and application software use the system call interface to access system resources like disks, printers, memory etc. The system call interface in UNIX provides a set of system calls (C functions). The purpose of the system call interface is to provide system integrity, as all low level hardware access is under control of the operating system. This prevents a program from corrupting the system.

Upon receiving a system call, the operating system validates its authenticity or permission, executes it on behalf of the program, then it returns the results. If the request is invalid or not authenticated, the operating system does not perform the request, it simply returns an error code to the program. The system call is accessible as a set of 'C' functions, as the majority of UNIX is also written in 'C'. Typical system calls are: _read —for reading from the disk unit; _write —for writing to the disk unit; _getch —for reading a character from a terminal; _putch —for writing a character to the terminal; and _ioctl —for controlling and setting device parameters.

The fundamental structure that the UNIX operating system uses to store information is the file. A file is a sequence of bytes, typically 8 bits long, and is equivalent to a character. UNIX keeps track of files internally by assigning each one a unique identifying number. These numbers, called i-node numbers, are used only within the UNIX operating system kernel itself. While UNIX uses i-node numbers to refer to files, it allows users to identify each file by a user-assigned name. A file name can be any sequence containing from one to fourteen characters.

There are three types of files in the UNIX file system: (1) ordinary files, which may be executable programs, text, or other types of data used as input or produced as output from some operation; (2) directory files, which contain lists of files; and (3) special files, which provide a standard method of accessing I/O devices.

UNIX provides users with a way of organizing files. Files may be grouped into directories. Internally, a directory is a file that contains the names of ordinary files and other directories and their corresponding i-node numbers. Given the name of a file, UNIX looks in the file's directory and obtains the corresponding i-node number for the file. With this i-node number, UNIX can examine other internal tables to determine where the file is stored and make it accessible to the user. UNIX directories themselves have names, each of which may also contain fourteen characters.

Just as directories provide a means for users to group files, UNIX supports the grouping of directories into a hierarchical file system. At the very top of a hierarchy is a directory. It may contain the names of individual files and the names of other directories. These, in turn, may contain the names of individual files (and still other directories, and so on). A hierarchy of files is the result. The UNIX file hierarchy resembles an upside-down tree with its root at the top. The various directories branch out until they finally trace a path to the individual files, which correspond to the tree's leaves. The UNIX file system is described as "tree-structured," with a single directory. All the files that can be reached by tracing a path down through the directory hierarchy from the root directory constitute the file system.

UNIX maintains a great deal of information about the files that it manages. For each file, the file system keeps track of the file's size, location, ownership, security, type, creation time, modification time, and access time. All of this information is maintained automatically by the file system as the files are created and used. UNIX file systems reside on mass storage devices such as disk files. These disk files may use fixed or removable type media, which may be rigid or flexible. UNIX organizes a disk as a sequence of blocks, which compose the file system. These blocks are usually either 512 or 2048 bytes long. The contents of a file are stored in one or more blocks, which may be widely scattered on the disk.

An ordinary file is addressed through the i-node structure. Each i-node is addressed by an index contained in an i-list. The i-list is generated based on the size of the file system, with larger file systems generally implying more files and, thus, larger i-lists. Each i-node contains thirteen 4-byte disk address elements. The direct i-node can contain up to ten block addresses. If the file is larger than this, then the eleventh address points to the first level indirect block. Address 12 and address 13 are used for second level and third level indirect blocks, respectively, with the indirect addressing chain before the first data block growing by one level as each new address slot in the direct i-node is required.

All input and output (I/O) is done by reading the writing files, because all peripheral devices, even terminals, are files in the file system. In a most general case, before reading and writing a file, it is necessary to inform the system of your intent to do so by opening the file. In order to write to a file, it may also be necessary to create it. When a file is opened or created (by way of the 'open' or 'create' system calls), the system checks for the right to do so and, if all is well, returns a non-negative integer called a file descriptor. Whenever I/O is to be done on this file, the file descriptor is used, instead of the name, to identify the file. This open file descriptor has associated with it a file table entry kept in the "process" space of the user who has opened the file. In UNIX terminology, the term "process" is used interchangeably with a program that is being executed. The file table entry contains information about an open file, including an i-node pointer for the file and the file pointer for the file, which defines the current position to be read or written in the file. All information about an open file is maintained by the system.

In conventional UNIX systems, all input and output is done by two system calls, 'read' and 'write,' which are accessed from programs having functions of the same name. For both system calls, the first argument is a file descriptor, the second argument is a pointer to a buffer that serves as the data source or destination. The third argument is the number of bytes to be transferred. Each 'read' or 'write' system call counts the number of bytes transferred. On reading, the number of bytes returned may be less than the number requested, because fewer than the number requested remain to be read. A return value of zero implies end of file, a return value of −1 indicates an error of some sort. For writing, the value returned is the number of bytes actually written. An error has occurred if this is not equal to the number which was supposed to be written.

The parameters of the 'read' and 'write' system calls may be manipulated by the application program that is accessing the file. Therefore the application must be sensitive to and take advantage of the multi-level store characteristics inherent in a standard system memory hierarchy. From the application perspective, it is advantageous if the system memory components can be viewed as a single level hierarchy. If this is properly done, the application could dispense with most of the I/O overhead.

One advantage of using a UNIX based operating system over other operating systems is that data can be isolated or segregated into different volume groups (VGs). The omnipresent "rootvg" contains the operating system details, and it is from this volume group that the computer runs. Similarly, data or application volume groups can also be created. The advantage of such volume groups is that, unlike competitive operating systems, an upgrade to a UNIX based operating system will only impact the rootvg and will not affect application data. Analogously, application upgrades will not impact the operating system in any way, presuming that the application has been segregated into its own VG.

Faults are inevitable in digital computer systems due to such things as the complexity of the circuits and the associated electromechanical devices. To permit system operation, even after the occurrence of a fault, the art has developed a number of fault-tolerant designs. Improved fault-tolerant digital data processing systems include redundant functional units, e.g., duplicate CPUs, memories, and peripheral controllers interconnected along a common system bus. Each of a pair of functional units responds identically to input received from the bus. In the outputs, if a pair of functional units do not agree, that pair of units is taken off-line, and another pair of functional units (a "spare") continues to function in its place.

Even with the recent developments in fault-tolerant systems, there are characteristics of UNIX systems that make them difficult to adapt to conventional fault-tolerant operation. An important element of fault-tolerant systems is a maintenance and diagnostic system that automatically monitors the condition (or "state") of functional units of the data processing system, particularly those that are more readily replaceable ("field replaceable units," or FRUs). The complexity of UNIX based systems requires that such fault-tolerant systems maintenance and diagnostic systems (or "state machines") have capabilities that require state-of-the-art systems maintenance and diagnostics systems.

Catastrophic failure is defined as any hardware problem, including but not limited to disk, planar, or adapter anomalies, which cause information about data placement or user environment to be lost to the base operating system. It is also possible, though less likely, that such failure incidents can originate within software due to defects in coding or method of execution.

Practically speaking, the beauty of UNIX is that it suffers fewer catastrophic failures than many other operating systems. For instance, protection of the kernel is far greater than is found in Win 95/98/NT. However, the complexity of UNIX and the adaptability/configurability of it means that reconfiguration following such a catastrophic failure can be a far more difficult task than configuring other operating systems. While UNIX based systems tend to fail less often than other operating systems, it is harder to recover from those failures because of the complexity of the system. Moreover, UNIX system problems that precipitate failure may have been discoverable for some length of time before the actual failure occurs.

Increased competition in the computer services marketplace is forcing providers to offer services that are both effective and efficient. As billable rates soar, customers are demanding near instantaneous results, placing increasingly higher expectations on performance resources. In light of these spiraling demands, one of the fundamental consulting engagements is to reliably provide the customer with system risk assessment, so that catastrophic errors like the ones described can be avoided through preventative maintenance. Typically, system maintenance guidelines are not enunciated; rather, they are simply carried out by experienced administrators as they are conceived. For instance, system administrators routinely check one or two of the parameters that are crucial to efficient system operation, and frequently the checks are not performed at regular intervals.

In today's increasingly complex computer environment, with large disk arrays, shared data, and a widespread user base, recreating a system environment following a catastrophic failure has become an ever more difficult task. Rebuilding UNIX images, in particular, requires an awareness of many system parameters. These parameters include printer definitions, tty definitions (terminal definitions or the name of a particular terminal controlling a given job or even serial port definitions because under Unix such devices have names of the form tty*), network interfaces, user IDs, and passwords. Failure to maintain awareness of these parameters may result in the inability to rebuild a system following a catastrophic failure. Furthermore, even if awareness of these parameters is maintained, the reconstruction of such system specifics can be both time consuming and prone to administrator error.

Typically, such recovery actions are taken (a) manually by human intervention; and/or (b) only if all such parameters have been captured onto some recoverable media or hard copy, such that an administrator can review the appropriate parameters after they have been lost from the system.

It would be advantageous to preserve data about these parameters while also providing reconstruction services in the aftermath of such a disaster. It would further be advantageous to provide a systematic means for automatically saving important parameters necessary for system image reconstruction and transferring those parameters to rebuild a system.

SUMMARY OF THE INVENTION

The present invention relates to a system and method for simplifying a system rebuild process. Initially, an automated data collection script is updated to include the identity and location of files containing personality and license information. A list of workstations to be rebuilt, which are supported in case of failure, is then compiled. The workstation list is called by the data collection script when it is executed. The data collection script collects personality and license information from the specified file on the listed workstations. The data collection script then outputs personality and license information to a temporary file at an offboard location. Upon notification of a failure of one of the workstations on the list, a restoration script is executed, which uses the output from the data collection script for restoring personality and license information that may have been lost due to the system failure.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is a flow chart depicting a high level view of a preferred embodiment of the present invention;

FIG. 6 is a lower level flowchart depicting a process for the restoration of personality information on post-failure systems for simplifying the rebuild process;

FIGS. 7A–7B illustrate a script for building a checklist. The script is called "crchscr.txt". Crchscr builds a checklist, which is used during the building of the new system;

FIGS. 8A–8L illustrate a script, which gets all of the "personality" information from a system;

FIG. 9 illustrates a list of workstations by hostname, which are going to be customized;

FIGS. 10A–10U illustrate a script for restoring the "personality" to the workstation/server;

FIG. 11 illustrates a script, which is used by refuscr.txt for special customizing of X11mwmrc file for X-Windows;

FIG. 12 illustrates a file used by refuscr.txt for resetting permissions of key files; and FIG. 13 illustrates a script for collecting filesystem size information, logical volume names, and mount points.

DETAILED DESCRIPTION OF THE PREFERRED EMBODIMENT

Figure 1:
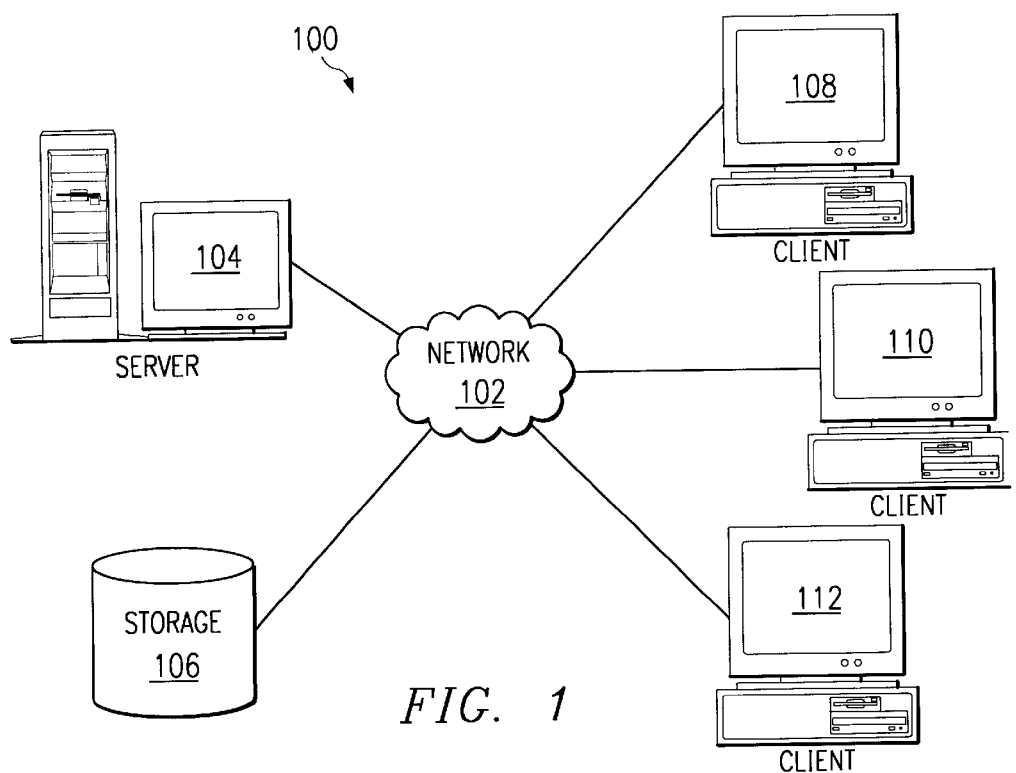
FIG. 1 is a pictorial representation of a distributed data processing system in which the present invention may be implemented.

With reference now to the figures, FIG. 1 is a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110 and 112 also are connected to network 102. These clients 108, 110 and 112 may be, for example, personal computers or network computers. For purposes of this application, a network computer is any computer coupled to a network, which receives a program or other application from another computer coupled to the network. In the depicted example, server 104 provides data, such as boot files, operating system images, and applications to clients 108, 110 and 112. Clients 108, 110 and 112 are clients to server 104. Distributed data processing system 100 may include additional servers, clients, and other devices not shown.

In the depicted example, distributed data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, education, and other computer systems that route data and messages. Of course, distributed data processing system 100 may also be implemented as a number of different types of networks, such as an intranet, a local area network (LAN), or a wide area network (WAN). FIG. 1 is intended as an example and not as an architectural limitation for the present invention.

Figure 2:
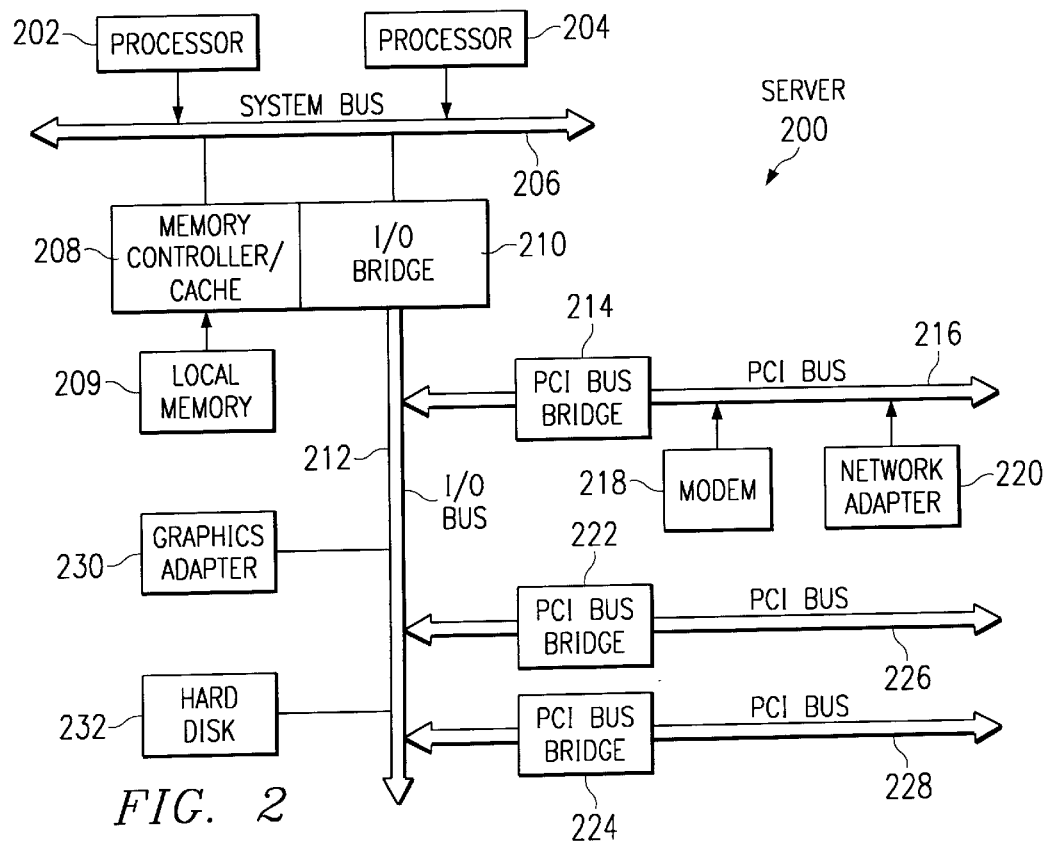
FIG. 2 is a block diagram depicting a data processing system that may be implemented as a server in accordance with a preferred embodiment of the present invention.

Referring to FIG. 2, a block diagram depicting a data processing system, which may be implemented as a server, such as server 104 in FIG. 1, in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations support four PCI expansion slots or add-in connectors. Communications links to network computers 108, 110 and 112 in FIG. 1 may be provided through modem 218 and network adapter 220 connected to PCI local bus 216 through add-in boards. Additional PCI bus bridges 222 and 224 provide interfaces for additional PCI buses 226 and 228, from which additional modems or network adapters may be supported. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, may also be used in addition to or in place of the hardware depicted. The depicted example is not meant to imply architectural limitations with respect to the present invention. The data processing system depicted in FIG. 2, for example, may be an IBM RISC/System 6000 system, a product of International Business Machines Corporation in Armonk, New York, running the Advanced Interactive Executive (AIX) operating system.

Figure 3:
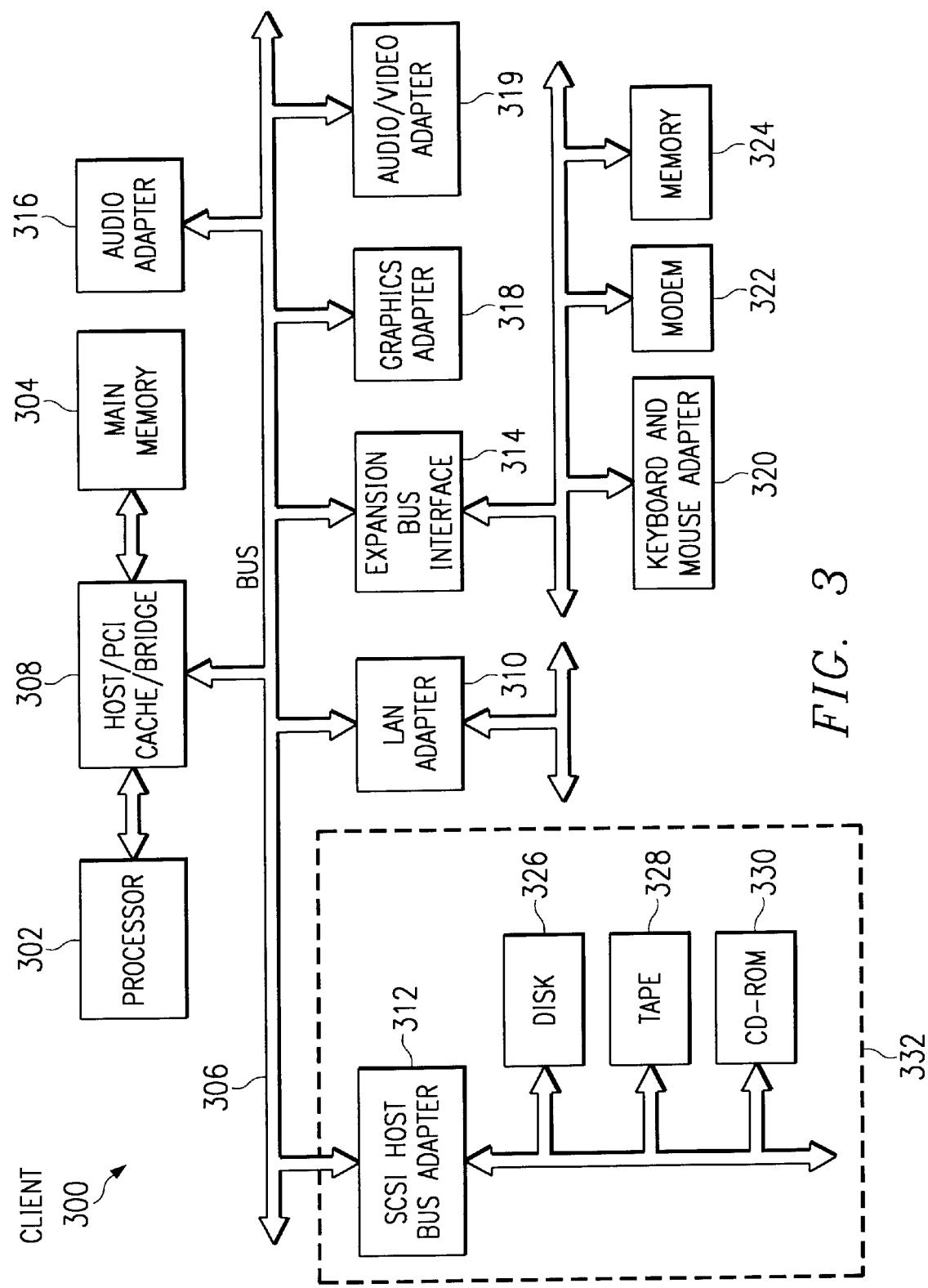
FIG. 3 is a block diagram illustrating a data processing system in which the present invention may be implemented.

With reference now to FIG. 3, a block diagram illustrating a data processing system in which the present invention may be implemented. Data processing system 300 is an example of a client computer. Data processing system 300 employs a peripheral component interconnect (PCI) local bus architecture. Although the depicted example employs a PCI bus, other bus architectures, such as Micro Channel and ISA, may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations support three or four PCI expansion slots or add-in connectors.

An operating system runs on processor 302 and is used to coordinate and provide control of various components within data processing system 300 in FIG. 3. The operating system may be a commercially available operating system such as a UNIX based operating system, AIX for instance, which is available from International Business Machines Corporation. "AIX" is a trademark of International Business Machines Corporation. Other operating systems include OS/2. An object oriented programming system, such as Java, may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3, denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide nonvolatile memory for storing operating system files and/or user-generated data.

Neither the depicted example in FIG. 3 nor the above-described examples are meant to imply architectural limitations.

A preferred embodiment of the present invention provides a method and system for solving the problem of post-failure rebuild for many system parameters in UNIX computers and utilizes NFS in the manner described above. Specifically, a set of comprehensive scripts has been painstakingly constructed to record many facets of a system's configuration, including printer definitions, tty definitions, network interfaces, user's Ids and passwords. Furthermore, the outputs of these scripts can be fed into their reconstructive counterparts, another series of scripts which has the ability to automatically reconstruct lost or destroyed system parameters back onto the "damaged" computer. Thus, if any of the aforementioned parameters are lost via hardware, software or administrator error, they can be easily reconstructed using the mechanisms described herein.

The basic operation of the scripts is such that the relevant data is captured across a network filesystem (NFS) by the scripts, as outlined below. By definition, the data containing the "personality" of the computer system, e.g., the user's passwords, the tty definitions, printer definitions, network interfaces, etc., is stored offboard on disparate media, physically separated from the target computer. In the event of a catastrophic error, where elements of the target computer's personality may be lost via software, hardware or operator error, the lost parameters can then be rebuilt with minimal human intervention across the network filesystem. It should be noted that the nature of NFS permits the target system and the host storage system to be at any conceivable geographical distance from each other; indeed, the only requisite is the ability to maintain an NFS link between the two via some reliable communications path.

The process might be broken into two separate high level functions —the data collection process and the restoration process after a catastrophic failure on the system. The two functions are independent of each other, in that the data collection function may be repeatedly invoked without invoking the restoration function.

The restoration process, on the other hand, is invoked only after the detection of a filesystem failure. Once a failure occurs, a replacement workstation (or the repaired workstation) must be brought online with a minimum of downtime and difficulty.

FIG. 4 is a flow chart depicting a high level view of a preferred embodiment of the present invention. A starting point for describing the process is with a decision of whether or not it is time to collect data (step 402). As noted above, time-based data collection is only one parameter from which to initiate data collection. Data collection is performed with an eye on rebuilding an image for the replacement workstation. In particular, data collection requires an awareness of many system parameters, including printer definitions, tty definitions, network interfaces, user IDs, and passwords. The system parameter values define a system's personality. Personality information can be thought of as any user and/or group selectable parameters, settings and/or options used for customizing either a computer system, software or firmware attributes. Personality parameters might be as uncomplicated as menu color schemes or as sophisticated as the specification of preferred algorithms needed for processing information on a specific application.

Returning to step 402, data collection cannot be performed after a catastrophic system failure. The personality values are either compromised or unavailable due the hardware failure. If the data is not to be collected the process flows to step 408 where a decision is made as to whether the system has failed.

Returning to step 402, if personality and license information is to be collected, then the process prepares for data collection (step 404). Here filesystems containing personality information and license information are identified, as well as the workstations which are to be supported by the data collection process. Additionally, filesystem, workstation, and server parameters used in the data collection process are checked for compliance with the requirements of the data collection process.

Once the data collection process preparation has been completed, the data is collected by invoking a data collection script (step 406). The refuscr.txt is an example of a data collection script. Here the data collection script (or collection tool) is executed and the requested data is stored on a specified server. The output of the collection script is personality and license information from the workstations supported by the restoration process. That information is stored offboard the supported workstations on a secure location (a server, usually the NIM server (network installation management, an environment that provides installation and configuration of software within a network interface), but could be any NFS server).

Importantly, the restoration process may be simultaneously invoked across a variety of replacement workstations. Therefore a list of workstations supported by the restoration, specified by hostname, is used by the data collection script for identifying workstations where personality and license information must be collected.

After the data has been successfully collected, the restoration process may be performed. The restoration function is initiated by a test performed to determine whether a catastrophic failure has occurred (step 408). After data collection, the personality information may merely be stored for use in case of a failure, in that case the process ends without executing the restoration function. Actually, the process depicted in FIG. 4 is a recursive process that is repetitively performed in the background. The process continues to iterate without executing a function until a condition is met for invoking either the data collection function or the restoration function.

Once the condition is met for invoking the restoration function, i.e., a catastrophic failure, the personality information is immediately used to restore the replacement workstation. The process then flows to step 410. However, as in the data collection function, the process initially prepares for restoring the personality of the system subsequent to the system personality information being restored (step 410). Here, specific attribute values associated with the workstations to be rebuilt, as well as both the NIM, the NFS (network filesystem) servers and the restoration scripts are updated for the execution of the restoration function.

After the updates have been successfully completed, the system may be restored by invoking the restoration function (step 412). There the personality information is transferred to the individual replacement workstation(s). However, personality information need not only be used by a replacement workstation, but might instead be used by the original workstation after it has been brought back up. Data that was lost or compromised as a result of the failure may now be restored from the personality information. The integrity of the personality data is guaranteed, as it was collected prior to the occurrence of the failure. The computer system is thereby immediately ready for use. Upon the completion of the restoration execution step, the process iterates back to step 402 and tests for the condition to perform the data collection function.

Figure 5:
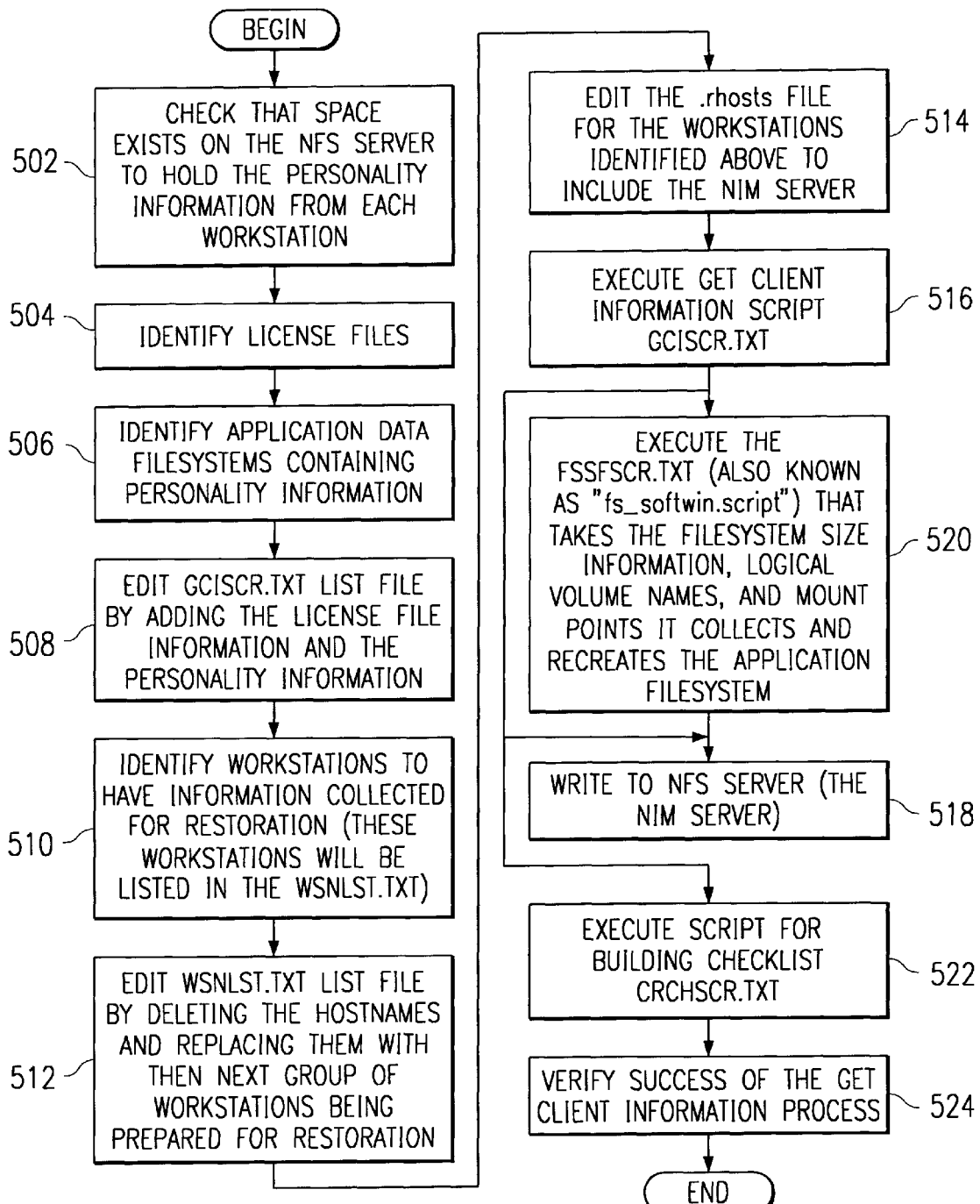
FIG. 5 is a lower level flowchart depicting a process for collecting data for simplifying a post-failure rebuild in accordance with a preferred embodiment of the present invention.

FIG. 5 is a lower level flowchart depicting a process for collecting data for simplifying a post-failure rebuild in accordance with a preferred embodiment of the present invention. In a preferred embodiment of the present invention, an NFS server is used for storing personality and license information is the NIM server. The NSF server used for storing the personality information must be checked for space needed for storing the personality and license information (step 502).

After sufficient space on the NFS server for the personality information has been confirmed, the application license files needed to be collected are identified (step 504). The identities of the license files are used to update the gciscr.txt script (get.client.info.script). Next, application data filesystems containing personality information are identified which will need to be collected (step 506). These are the filesystems to be recreated before the data is restored. The identities of both the license files and the application data filesystems containing personality information are used to edit the gciscr.txt script (step 508). By knowing the identities of personality and license file, the gciscr.txt script can collect the personality and license information at the specified file locations.

The personality and license information files identified above pertain to specific workstations. The data is collected as a safeguard against any of the workstations failing and needing restoration. Therefore, a list of workstations to be supported by the restoration process, which will be rebuilt in the event that one fails, must be compiled (step 510). If one of the workstations on the list fails, it will be restored using the personality and license information collected by the gcisci.txt script. The list is maintained in the wsnlst.txt file (workstation.name.list) and represents all workstations for which personality information will be collected (step 512). When invoked, the gciscr.txt script (get.client.information.script) calls the wsnlst.txt script for the list of workstations from which to collect information. For workstations to be restored using the restoration script of the present invention, personality and license information must be collected from specified files which are associated with workstations specified in the wsnlst.txt list. Only those workstations or their replacements will be rebuilt using the collected information.

Next, a remote host must be authorized by the workstations on the wsnlst.txt list. The .rhosts (remote host) file associated with each workstation is updated to include the NIM server (nimsvr) as a remote host (step 514). Setting .rhosts will allow for rsh commands to be executed on each workstation. The rsh command logs into the remote host specified by the .rhost parameter. The rsh command then sends standard input from the local command line to the remote command (the NIM server) and receives standard output and standard error from the remote command.

After the gciscr.txt script is updated, the wsnlst.txt list is created and the remote server is authorized for the workstations, the gciscr.txt script (get.client.information.script) can be executed (step 516). The gciscr.txt script collects personality and license information for the workstations listed in the wsnlst.txt list from the files specified in the gciscr.txt script. The gciscr.txt script simultaneously calls the wsnlst.txt file for workstations hostnames, the fssfscr.txt file, which collects filesystem size information, logical volume names, and mount points (step 520) and the crchscr.txt script, which builds a checklist (step 522) that is used during the building of the new system to verify the success of the (get.client.information.script) (step 524).

Returning the step 516, the gciscr.txt script generates a temporary output file containing the personality and license information needed for customizing any replacement workstations. Any licensing or personality information lost during a system failure can be restored using the temporary file outputted from executing the gciscr.txt script. That temporary file is written to the NFS server (step 518). As discussed above, in accordance with preferred embodiment of the present invention the NFS server dedicated for storing the temporary files containing the personality and license information is the NIM server.

Returning to step 520, once executed the fssfscr.txt script also generates temporary output files containing the filesystem size information, logical volume names, and mount points and collects and recreates the application filesystem. That information is also written to the NFS server (step 518).

Returning again to step 516, if there are errors during the execution of the gciscr.txt script, the program will display error messages. All error messages are written to an error-log.txt.file. If the error message "Unsuccessful NFS mount to" is displayed, the user can either cancel the entire capture session for all workstations named in wsnlst.txt with a control break, or the user can let the process continue on its own. Successful steps also display messages on the screen.

For example, this message is critical to the success of the process: "Successful NFS mount to". When the list of workstations has had the data captured, then a checklist is printed for each workstation (step 522). The checklist built by the crchscr.txt script is used during the building of the new system. This is used whenever the workstation parameters have to be restored.

The error messages, if any were generated, and the checklist, generated in step 522, are analyzed in order to verify the success of the gciscr.txt execution (step 524) and the process ends.

FIG. 6 is a lower level flowchart depicting a process for the restoration of personality information on post-failure systems for simplifying the rebuild process. The process begins with restoration preparations. The refuscr.txt script (restore.full.script) is updated with information from a temporary file, which was created by executing the gciscr.txt script (step 602). The restore.full.script is updated with the application information, so that licenses will be either restored or upgraded, applications will be either restored or upgraded, and/or application data filesystems will be restored. Next, a permanent hostname and IP address are selected for the rebuilt computer systems (step 604). Hostname and IP address are used to tell refuscr.txt the identity of the new system and the location of the "personality" files on the NIM server (NFS server). The restoration scripts are then copied to the rebuilt workstation (step 606). Here, the permanent hostname and IP address are available for the replacement (or repaired) workstation. The restoration scripts are then executed on the replacement workstations from a root user session on the replacement workstation. Status messages are displayed as each parameter is restored to the replacement workstation.

Once the restoration scripts are in place on the replacement workstations, the refuscr.txt script is executed on each of the workstations (step 608). The refuscr.txt script automatically restores the personality and license information on the workstation that may have been deleted during as a result of the CPU failure. Status messages are displayed as each parameter is restored to the replacement workstation. For example: "restoring/etc/security/group". The user will be prompted to continue at each step and has the option to discontinue the process with a control break. For example: "press enter to continue".

The mwmsed.txt script is called by refuscr.txt and is executed, so that customizing of the X11mwmrc file for X-Windows can occur (step 610). File permissions are restored using a custom permission list (perm.list) (step 612).

Finally, unique application filesystems are recreated using the information collected by the fssfscr.txt script (step 614). Filesystem size information, logical volume names, and mount points were collected by the fssfscr.txt script and are used to recreate the application filesystem prior to restoring the application and its data. Importantly, the newly-created filesystems may differ somewhat in size from filesystems originally on the replacement workstations. The restored filesystems might be required to hold more data than a different version being replaced. Therefore, the refuscr.txt recreates the filesystems from the existing filesystem structure, while allowing space for the new versions of the software. Once the filesystems have been recreated, the data can be restored into the filesystems (step 616).

Upon completion, a user's rebuilt workstation is re-configured with personality information matching that information which was present on the user's workstation prior to the workstation failure. The user is thus freed from the tedious tasks associated with re-customizing the workstation after a catastrophic system failure and able to devote full attention to the work product rather than rebuilding the workstation. The mundane tasks of gathering personality information and using that data for customizing a group of workstation is automated and may be performed from a centralized location. The system administrator, on the other hand, is freed from the responsibility of manually rebuilding a workstation or group of workstations following a failure.

By providing the means, both to capture data about production systems and to preserve it on physically separated media, the present invention ensures a heightened readiness of client operations. By providing the means to automatically restore such data, thereby recreating the unique "personalities," i.e. unique system parameters onto each computer following a failure incident, the present invention provides a mechanism to minimize recovery time while mitigating the chance of operator induced errors. Accordingly, the result is increased customer satisfaction through reduced cost of ownership for clients.

By giving a centrally located administrator the ability to preserve details of each computer's "personality" across a disparate network and by using the tried and true assurances which network filesystems, the present invention provides a new technique, which transcends either of these two approaches used in prior art system rebuilding.

The present invention provides additional benefits to UNIX-based operations. Although developed on AIX, the principles here are easily extendible to any other UNIX system, including LINUX, Solaris, and others. More importantly, the underlying process for automated rebuilt CPUs is usable in other operating systems other than those with a UNIX flavor. The concept of maintaining version control across a wide number of computer systems is both new and unique and will undoubtedly find favor with anyone running mission-critical applications. The scripts and their respective roles are as follows:

FIGS. 7A–7B illustrate a script for building a checklist. The script is called "crchscr.txt". Crchscr builds a checklist, which is used during the building of the new system.

FIGS. 8A–8L illustrate a script, which gets all of the "personality" information from a system. The script is called "gciscr.txt" (also called get.client.info.script). This is the main program and stores an output file containing personality and license information on an NFS server. In the process, it creates a variety of files, which are used during the building of the new system. It requires wsnlst.txt (also known as wsname.list) as an input file.

FIG. 9 illustrates a list of workstations by hostname, which are going to be customized. The file is called "wsnlst.txt" and is used by gciscr.txt to collect information.

FIGS. 10A–10U illustrate a script for restoring the "personality" to the workstation/server. The script is called "refuscr.txt" (also called restore.full.script) is the main program, which restores the "personality" to the workstation/server, which is retrieved from the NFS server. It uses the output files created by gciscr.txt.

FIG. 11 illustrates a script which is used by refuscr.txt for special customizing of X11mwmrc file for X-Windows. The script is called "mwmsed.txt."FIG. 12 illustrates a file used by refuscr.txt for resetting permissions of key files. The file is called "perms.list", and it contains information about key files whose permissions might have been "modified" during the capture or restore process.

FIG. 13 illustrates a script for collecting filesystem size information, logical volume names, and mount points. The script is called "fssfscr.txt" (also known as "fs_softwin.script"), and after collecting the information, it then takes the filesystem size information, logical volume names, and mount points it collected and recreates the application filesystem prior to restoring the application and its data.

It is important to note that, while the present invention has been described in the context of a fully functioning data processing system, those of ordinary skill in the art will appreciate that the processes of the present invention are capable of being distributed in the form of a computer readable medium of instructions and a variety of forms, and that the present invention applies equally regardless of the particular type of signal bearing media actually used to carry out the distribution. Examples of computer readable media include recordable-type media, such as floppy discs, hard disk drives, RAM, and CD-ROMs and transmission-type media, such as digital and analog communications links. The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention and the practical application, and to enable others of ordinary skill in the art to understand the invention for various embodiments with various modifications as are suited to the particular use contemplated.

What is claimed is:

1. A data processing implemented method for providing network filesystem-based customized computer system rebuilds comprising:
    collecting information values from a plurality of computer systems using an automated data collection script;
    receiving notification of computer system failure, wherein the computer system is one of the plurality of computer systems;
    transmitting a copy of an automated restoration script to a replacement computer system in response to a receipt of a notification of failure;
    executing, within the replacement computer system, the automated restoration script; and
    automatically rebuilding, by the replacement computer system in response to the replacement computer system executing the automated restoration script, a computer system for the computer system that failed using the automated restoration script, wherein the automated restoration script uses the information values collected from the automated data collection script for restoring corresponding types of information on the plurality of computer systems.

2. The method recited in claim 1 wherein the automated data collection script is updated using one of printer definitions, tty definitions, network interfaces, user passwords, and license information.

3. The method recited in claim 2 wherein the automated data collection script calls a list of computer systems, wherein the listed computer systems may be rebuilt subsequent to a computer system failure.

4. The method recited in claim 1 wherein the automated data collection script receives a list of computer systems from which to collect the information values.

5. The method recited in claim 1 further comprises:
    recreating application filesystems associated with the plurality of computer systems using an automated filesystem recreation script.

6. The method recited in claim 1, wherein the replacement computer system is one of a computer system that is different from the computer system that failed and the computer system that failed.

7. The method recited in claim 1, wherein collecting the information values from the plurality of computer systems is performed at regularly scheduled times.

8. The method recited in claim 1, wherein collecting the information values from the plurality of computer systems is performed on the basis of a scheduling condition being met and automatically rebuilding a computer system is performed on the basis of a computer system failure condition being met.

9. The method according to claim 1, further comprising the steps of:
    receiving notification of a computer system failure from a plurality of said plurality of computer systems;
    transmitting a copy of an automated restoration script to a plurality of replacement computer systems to be used as replacements for said plurality of said plurality of computer systems that failed;
    executing, within each one of said plurality of replacement computer systems, the automated restoration script; and
    automatically rebuilding, by each one of said plurality of replacement computer systems, a computer system for one of the plurality of said plurality of computer systems that failed using the automated restoration script received by each one of said plurality of replacement computer systems.

10. The method according to claim 1, further comprising the step of:
    executing the automated restoration script only in response to a receipt of notification of computer system failure.

11. The method according to claim 1, further comprising the step of:
    automatically rebuilding a computer system, wherein the computer system is a UNIX image.

12. A data processing system for providing network filesystem-based customized computer system rebuilds comprising:
    collecting means for collecting information values from a plurality of computer systems using an automated data collection script;
    receiving means for receiving notification of computer system failure, wherein the computer system is one of the plurality of computer systems;
    transmitting means for transmitting a copy of an automated restoration script to a replacement computer system in response to a receipt of a notification of failure;
    the replacement computer system for executing the automated restoration script; and
    rebuilding means for automatically rebuilding, by the replacement computer system in response to the replacement computer system executing the automated restoration script, a computer system for the computer system that failed using the automated restoration script, wherein the automated restoration script uses the information values collected from the automated data collection script for restoring corresponding types of information on the plurality of computer systems.

13. The system recited in claim 12 wherein the automated data collection script is updated using one of printer definitions, tty definitions, network interfaces, user passwords, and license information.

14. The system recited in claim 13 wherein the automated data collection script calls a list of computer systems, wherein the listed computer systems may be rebuilt subsequent to a computer system failure.

15. The system recited in claim 12 wherein the automated data collection script receives the list of computer system from which to collect the information values.

16. The system recited in claim 12 further comprises:

recreating means for recreating application filesystems associated the plurality of computer systems using an automated filesystem recreation script.

17. The system recited in claim 12, wherein the replacement computer system is one of a computer system that is different from the computer system that failed and the computer system that failed.

18. The system recited in claim 12, wherein collecting the information values from the plurality of computer systems is performed at regularly scheduled times.

19. The system recited in claim 12, wherein collecting the information values from the plurality of computer systems is performed on the basis of a scheduling condition being met and automatically rebuilding a computer system is performed on the basis of a computer system failure condition being met.

20. The system according to claim 12, further comprising:

receiving means for receiving notification of a computer system failure from a plurality of said plurality of computer systems;

transmitting means for transmitting a copy of an automated restoration script to a plurality of replacement computer systems to be used as replacements for said plurality of said plurality of computer systems that failed;

executing means for executing, within each one of said plurality of replacement computer systems, the automated restoration script; and rebuilding means for automatically rebuilding, by each one of said plurality of replacement computer systems, a computer system for one of the plurality of said plurality of computer systems that failed using the automated restoration script received by each one of said plurality of replacement computer systems.

21. The system according to claim 12, further comprising:

executing means for executing the automated restoration script only in response to a receipt of notification of computer system failure.

22. The system according to claim 12, further comprising:

the rebuilt computer system being a UNIX image.

23. A data processing implemented computer program product for providing network filesystem-based customized computer system rebuilds comprising:

collecting instructions for collecting information values from a plurality of computer systems using an automated data collection script;

receiving instructions for receiving notification of computer system failure, wherein the computer system is one-of the plurality of computer systems;

instructions for transmitting a copy of an automated restoration script to a replacement computer system in response to a receipt of a notification of failure;

instructions for executing, within the replacement computer system the automated restoration script; and rebuilding instructions for automatically rebuilding, by the replacement computer system in response to the replacement computer system executing the automated restoration script, a computer system for the computer system that failed using the automated restoration script, wherein the automated restoration script uses the information values collected from the automated data collection script for restoring corresponding types of information on the plurality of computer systems.

* * * * *